US011861353B2

(12) United States Patent
Kuwahara

(10) Patent No.: US 11,861,353 B2
(45) Date of Patent: Jan. 2, 2024

(54) SYSTEM UPDATE PROCEDURE PLANNING APPARATUS, METHOD, AND COMPUTER-READABLE RECORDING MEDIUM

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 17/612,354

(22) PCT Filed: Apr. 7, 2020

(86) PCT No.: PCT/JP2020/015633
§ 371 (c)(1),
(2) Date: Nov. 18, 2021

(87) PCT Pub. No.: WO2020/241060
PCT Pub. Date: Dec. 3, 2020

(65) Prior Publication Data
US 2022/0244940 A1    Aug. 4, 2022

(30) Foreign Application Priority Data

May 31, 2019    (JP) ................................ 2019-102388

(51) Int. Cl.
*G06F 9/44*    (2018.01)
*G06F 8/65*    (2018.01)
(Continued)

(52) U.S. Cl.
CPC .................. *G06F 8/65* (2013.01); *G06F 8/20* (2013.01); *G06F 8/35* (2013.01); *G06F 9/448* (2018.02)

(58) Field of Classification Search
CPC ... G06F 8/65; G06F 9/448; G06F 8/20; G06F 8/35
(Continued)

(56) References Cited

U.S. PATENT DOCUMENTS

2005/0283278 A1* 12/2005 Boutin ...................... G06F 8/65
701/1
2014/0282368 A1* 9/2014 Howard .................... G06F 8/20
717/105
(Continued)

FOREIGN PATENT DOCUMENTS

JP      2015-215885 A    12/2015
WO      2017/154763 A1   9/2017

OTHER PUBLICATIONS

International Search Report for PCT Application No. PCT/JP2020/015633, dated Jun. 16, 2020.

*Primary Examiner* — Chuck O Kendall
(74) *Attorney, Agent, or Firm* — Sughrue Mion, PLLC

(57) ABSTRACT

Provided is a system update procedure planning apparatus capable of preventing an explosive increase in the amount of computation when solving an automatic planning problem in system update. The state element model simplification section 101 outputs a simplified state element model by applying a simplification transformation based on the unit affiliation information to the state element model. The automatic planning section 102 outputs an executable route, for the simplified state element model, from an initial state thereof to a target state. The internal transition completion section 103 converts the executable route from the initial state to the target state on the simplified state element model into the executable route from an initial state to a target state on the state element model before simplification.

8 Claims, 23 Drawing Sheets

(51) Int. Cl.
  *G06F 9/448* (2018.01)
  *G06F 8/20* (2018.01)
  *G06F 8/35* (2018.01)
(58) Field of Classification Search
  USPC .......................................... 717/100–105, 168
  See application file for complete search history.

(56) References Cited

U.S. PATENT DOCUMENTS

2015/0324211 A1 11/2015 Kuroda et al.
2020/0326952 A1 10/2020 Nakanoya

* cited by examiner

FIG. 4
★ STEP 1: SOLVE THE PROBLEM IGNORING STATES OF
AppConf(2) AND AppPkg(2)
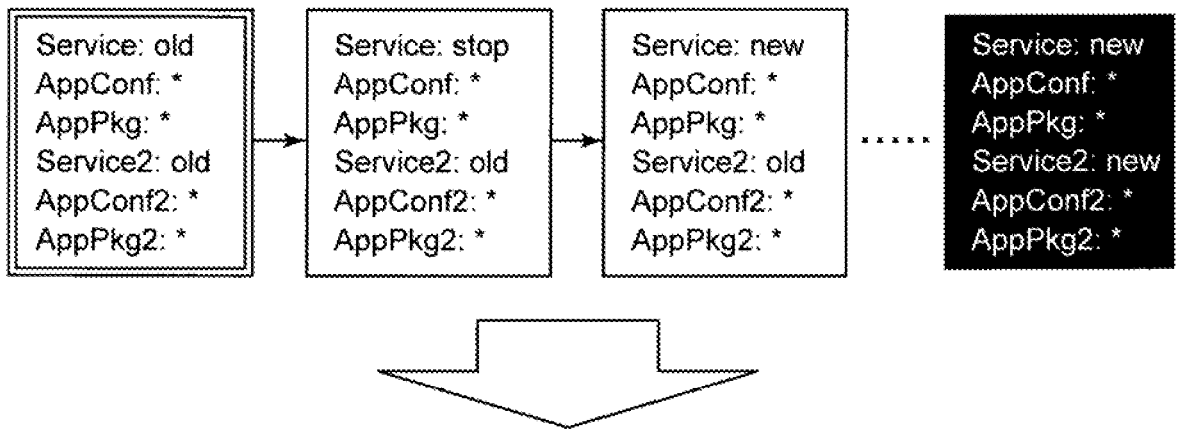
OBTAINED UPDATE PROCEDURE:
   Service: old → stop
   Service: stop → new
   Service2: old → stop
   Service2: stop → new
★ STEP 2: RETROFIT UPDATE PROCEDURES OF
AppConf(2) AND AppPkg(2)
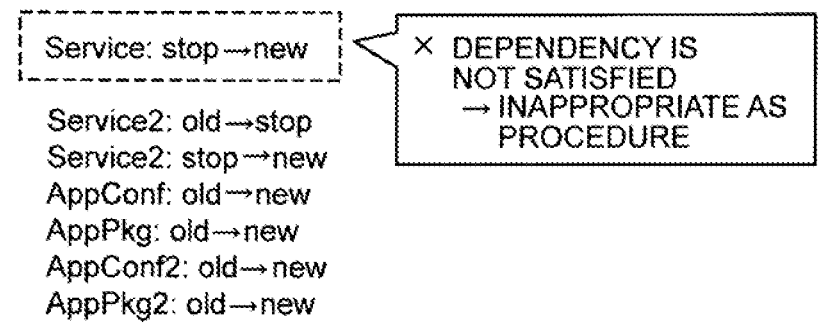

FIG. 11

| KEY | VALUE |
|---|---|
| A1 ⇒ A2 | A1 → A2 |
| A1 ⇒ A3 | A1 → A2 → A3 |
| A1 ⇒ A4 | A1 → A4 |
| A2 ⇒ A1 | A2 → S1 |
| A2 ⇒ A3 | A2 → A3 |
| A2 ⇒ A4 | A2 → A3 → A4 |
| A3 ⇒ A1 | A3 → A4 → A1 |
| A3 ⇒ A2 | A3 → A2 |
| A3 ⇒ A4 | A3 → A4 |
| A4 ⇒ A1 | A4 → A1 |
| A4 ⇒ A2 | A4 → A1 → A2 |
| A4 ⇒ A3 | A4 → A3 |

FIG. 14

| SOURCE | DESTINATION | ROUTE IN C[j]' |
|---|---|---|
| Server<i>: Stop<br>CONFIGURATION FILE 1<i>: old<br>CONFIGURATION FILE 2<i>: old | Server<i>: Stop<br>CONFIGURATION FILE 1<i>: new<br>CONFIGURATION FILE 2<i>: new | CONFIGURATION FILE 1<i>: old→new,<br>CONFIGURATION FILE 2<i>: old→new |
| Server<i>: Stop<br>CONFIGURATION FILE 1<i>: old<br>CONFIGURATION FILE 2<i>: old | Server<i>: Stop<br>CONFIGURATION FILE 1<i>: old<br>CONFIGURATION FILE 2<i>: new | CONFIGURATION FILE 2<i>: old→new |
| Server<i>: Stop<br>CONFIGURATION FILE 1<i>: old<br>CONFIGURATION FILE 2<i>: old | Server<i>: Stop<br>CONFIGURATION FILE 1<i>: new<br>CONFIGURATION FILE 2<i>: old | CONFIGURATION FILE 1<i>: old→new |
| Server<i>: Stop<br>CONFIGURATION FILE 1<i>: old<br>CONFIGURATION FILE 2<i>: new | Server<i>: Stop<br>CONFIGURATION FILE 1<i>: old<br>CONFIGURATION FILE 2<i>: old | CONFIGURATION FILE 2<i>: new→old |
| ... | ... | ... |

SYSTEM UPDATE PROCEDURE PLANNING APPARATUS, METHOD, AND COMPUTER-READABLE RECORDING MEDIUM

This application is a National Stage Entry of PCT/JP2020/015633 filed on Apr. 7, 2020, which claims priority from Japanese Patent Application 2019-102388 filed on May 31, 2019, the contents of all of which are incorporated herein by reference, in their entirety.

TECHNICAL FIELD

The present invention relates to a system update procedure planning apparatus, a system update procedure planning method, and a computer-readable recording medium recording a system update procedure planning program, and in particular relates to a system update procedure planning apparatus, a system update procedure planning method, and a computer-readable recording medium recording a system update procedure planning program used for solving an automatic planning problem in which an autonomous control system including artificial intelligence determines an execution procedure of a task to achieve an objective while satisfying constraints.

BACKGROUND ART

An automatic planning of a computer system (hereinafter referred to as the "system" in this application)) is, for example, a technique for determining, by an artificial intelligence, the next action to be taken based on information about the known environment, and for making an execution plan of a series of actions to achieve an objective (hereinafter simply referred to as a "procedure"). PTL 1 describes a method for generating a "procedure" for constructing and updating an ICT (Information and Communication Technology) system using an automatic planning technique. The application of such an automatic planning technique to system update is hereinafter referred to as "system update procedure planning". Also, an apparatus in which the automatic planning technique is applied to system update is referred to as a "system update procedure planning apparatus".

Also, PTL 2 describes the use existing algorithms to derive a change procedure.

CITATION LIST

Patent Literature

PTL 1: US 2015/0324211 A1
PTL 2: International Publication WO 2017/154763

SUMMARY OF INVENTION

Technical Problem

Given an initial state and a target state, finding a path of transition from the initial state to the target state is called an automatic planning problem. It is desirable to prevent an explosive increase in the amount of computation when solving the automatic planning problem in system update.

[Objective of the invention] Therefore, it is an object of the present invention to provide a system update procedure planning apparatus, a system update procedure planning method, and a computer-readable recording medium in which a system update procedure planning program is recorded, which can prevent an explosive increase in the amount of computation when solving an automatic planning problem in system update.

Solution to Problem

A system update procedure planning apparatus according to an example embodiment of the present invention is a system update procedure planning apparatus for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning apparatus comprising: a state element model simplification section that outputs a simplified state element model by applying a simplification transformation based on the unit affiliation information to the state element model; an automatic planning section that outputs an executable route, for the simplified state element model, from an initial state thereof to a target state; and an internal transition completion section that converts the executable route from the initial state to the target state on the simplified state element model into the executable route from an initial state to a target state on the state element model before simplification.

A system update procedure planning apparatus according to an example embodiment of the present invention is a system update procedure planning apparatus for outputting an executable route on a state element model as a system update procedure, based on the state element model describing a system update by a plurality of state elements and a constraint expression specified with the plurality of state elements, the system update procedure planning apparatus comprising: a unit configuration detection section that takes the state element model as input and outputs unit affiliation information indicating to which of a plurality of units each state element in the state element model belongs, a state element model simplification section that outputs a simplified state element model by applying a simplification transformation based on the unit affiliation information to the state element model; an automatic planning section that outputs an executable route, for the simplified state element model, from an initial state thereof to a target state; and an internal transition completion section that converts the executable route from the initial state to the target state on the simplified state element model into the executable route from an initial state to a target state on the state element model before simplification.

A system update procedure planning method according to an example embodiment of the present invention is a system update procedure planning method for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning method comprising: outputting a simplified state element model by applying a simplification transformation based on the unit affiliation information to the state element model; outputting an executable route, for the simplified state element model, from an initial state thereof to a target state; and converting the executable route from the initial state to the target state on the simplified state element model into the executable route from an initial state to a target state on the state element model before simplification.

A system update procedure planning method according to an example embodiment of the present invention is a system update procedure planning method for outputting an executable route on a state element model as a system update procedure, based on the state element model describing a system update by a plurality of state elements and a constraint expression specified with the plurality of state elements, the system update procedure planning method comprising: taking the state element model as input and outputting unit affiliation information indicating to which of a plurality of units each state element in the state element model belongs; outputting a simplified state element model by applying a simplification transformation based on the unit affiliation information to the state element model; outputting an executable route, for the simplified state element model, from an initial state thereof to a target state; and converting the executable route from the initial state to the target state on the simplified state element model into the executable route from an initial state to a target state on the state element model before simplification.

A computer-readable recording medium according to an example embodiment of the present invention is a computer-readable recording medium in which a system update procedure planning program is recorded, the system update procedure planning program being executed on a computer for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning program causing the computer to perform: a state element model simplification process of outputting a simplified state element model by applying a simplification transformation based on the unit affiliation information to the state element model; an automatic planning process of outputting an executable route, for the simplified state element model, from an initial state thereof to a target state; and an internal transition completion process of converting the executable route from the initial state to the target state on the simplified state element model into the executable route from an initial state to a target state on the state element model before simplification.

A computer-readable recording medium according to an example embodiment of the present invention is a computer-readable recording medium in which a system update procedure planning program is recorded, the system update procedure planning program being executed on a computer for outputting an executable route on a state element model as a system update procedure, based on the state element model describing a system update by a plurality of state elements and a constraint expression specified with the plurality of state elements, the system update procedure planning program causing the computer to perform: a unit configuration detection process of taking the state element model as input and outputting unit affiliation information indicating to which of a plurality of units each state element in the state element model belongs; a state element model simplification process of outputting a simplified state element model by applying a simplification transformation based on the unit affiliation information to the state element model; an automatic planning process of outputting an executable route, for the simplified state element model, from an initial state thereof to a target state; and an internal transition completion process of converting the executable route from the initial state to the target state on the simplified state element model into the executable route from an initial state to a target state on the state element model before simplification.

Advantageous Effects of Invention

According to the present invention, an explosive increase in the amount of computation can be prevented when solving an automatic planning problem in system update.

BRIEF DESCRIPTION OF DRAWINGS

FIG. 4 It depicts a figure showing an example of solving an automatic planning problem.

FIG. 11 It depicts a schematic diagram showing an example of an internal route retention table.

FIG. 14 It depicts a schematic diagram showing a specific example of a part of the internal route retention table.

DESCRIPTION OF EMBODIMENTS

Figure 1:
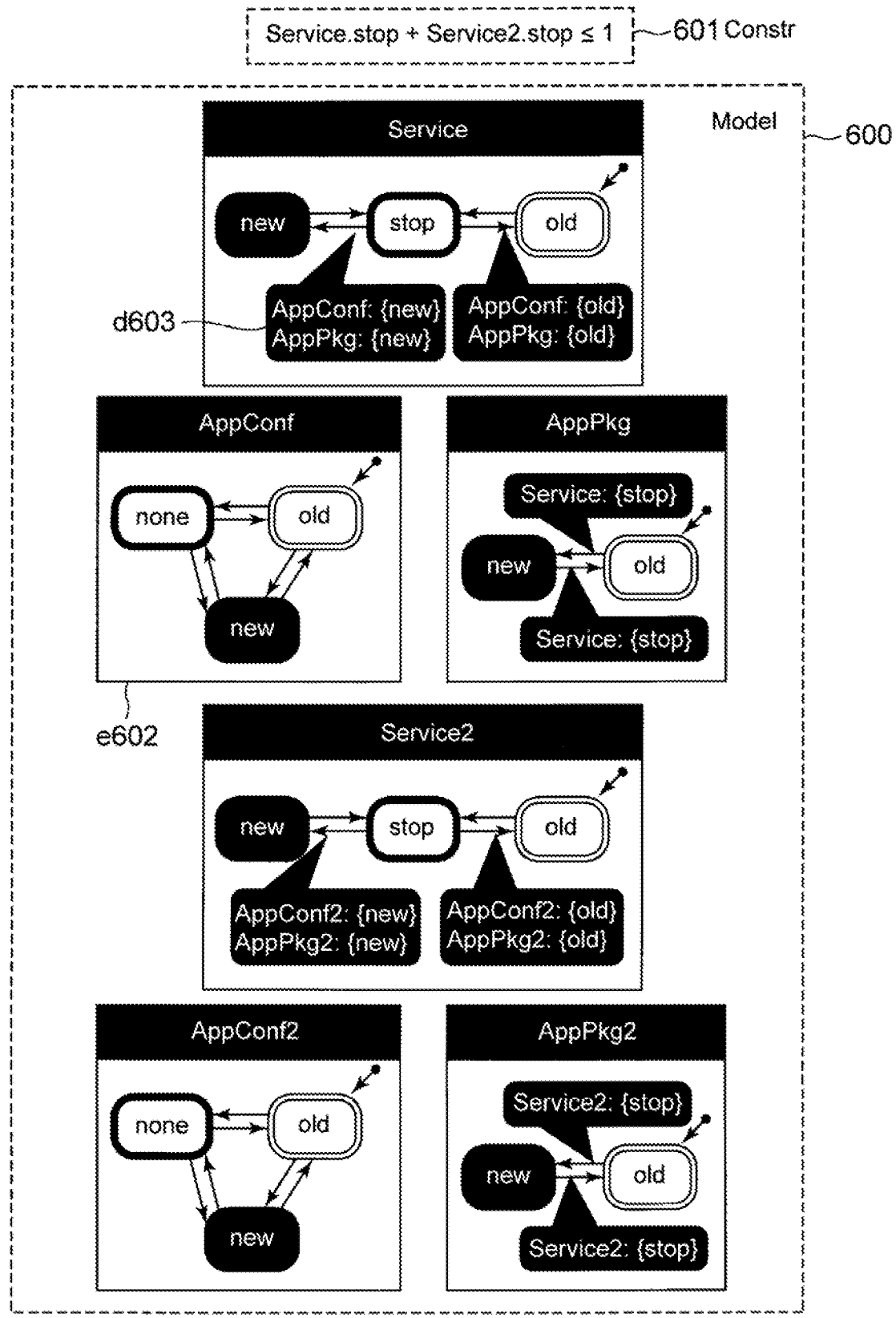
FIG. 1 It depicts a schematic diagram showing an example of a state element model.

Before describing example embodiments of the present invention, the state element model and the like will first be described. FIG. 1 is a schematic diagram showing an example of a model that models a system to which an automatic planning problem is applied. The model that models the system to which the automatic planning problem is applied in the form illustrated in FIG. 1 is called the "state element model. In FIG. 1, an example of a state element model corresponding to an update of a web service deployed on a virtual machine is illustrated.

The state element model described in FIG. 1 comprises two parts, Model 600 and Constr 601. Model 600 comprises a plurality of rectangles that conceptually represent parts of the system or updates thereof. Each of these multiple rectangles is referred to as a "state element". Each state element has a unique identification (ID) in the state element model. Each state element contains a system of so-called state transition systems. That is, each state element contains a system comprising "states" indicated by rounded squares and "transitions" indicated by arrows connecting "states" and "states". These states and transitions have unique IDs in the state elements. There may be duplication in the IDs of the "states" and the "transitions" among different state elements. The string shown in the rounded square is the ID of the "state". In FIG. 1, the ID of "transition" is omitted. Note that a "state" is not necessarily indicated by a rounded rectangle, and in the example described below, a "state" may be indicated by a circle or an oval.

Each rectangle (in other words, each state element) contains one "initial state" corresponding to the state before the update, and one "target state" corresponding to the state after the update. In the following description, the "initial state" is illustrated by a double-lined rounded rectangle or the like, and the "target state" is illustrated by a black-filled rounded rectangle or the like. However, these two types of states are not necessarily different states, and the initial state and the target state may be identical. In addition, each state element has a "current state" that indicates what state the part that the state element represents is currently in. In the following description, the state in which an arrow with a black circle is added to the end opposite to the arrowhead is illustrated as the "current state". The arrow representing the current state (the arrow with the black circle at the end opposite to the arrowhead) is different from the arrow representing a transition. The current state is always the same as the initial state at the beginning, and it is moved by state transitions during the automatic planning procedure.

A concrete example of a state element is shown below. In FIG. 1, the sign e602 indicates a state element (ID: AppConf) representing a configuration file of an application and its update. The state element AppConf takes three states, "does not exist (none)," "a configuration file before update (old) exists (old)," and "a configuration file of the latest version exists (new)," and can go back and forth between them. In other words, AppConf is a state element that expresses the update of the configuration file of the application. As mentioned earlier, the current state of AppConf is the same as the initial state "old", but the current state can be moved to "new" by using the transition extending to "new".

Model 600 also includes labels attached to the transitions contained in the state elements, as shown by the sign d603 in FIG. 1. The content described in the label is referred to as a "dependency" on the transition to which the label is attached. The label contains one or more records of the form "e: {s[1], s[2], . . . , s[k]}". Here, e is the ID of the state element, and s[1], s[2], . . . , s[k] are all IDs of the states included in the state element e. In the following, "e: {s[1], s[2], . . . , s[k]}" contained in the label is referred to as a "dependency record" for state element e. The "dependency" is a set of dependency records of the form "e: {s[1], s[2], . . . , s[k]}". If a dependency is attached to a transition, the state cannot be moved by the transition unless all the dependency records contained in the label are satisfied. Here, the dependency record "e: {s[1], s[2], . . . , s[k]}" is satisfied means that the current state of state element e is consistent with one of the states s[1], s[2], . . . , s[k]. The dependency is said to be satisfied when all the dependency records listed in the label are satisfied. The dependency indicates a sufficient condition for the state transition to be executed normally. In other words, under the condition that the dependency is satisfied, it is theoretically expected that the execution of the transition will be completed normally.

A specific example of dependency is shown. The label d603 shown in FIG. 1 is attached to a transition extending from "stop" to "new" contained in a state element (ID: Service) representing the startup state of the service, and contains two dependency records "AppConf: {new}" and "AppPkg: {new}". This dependency prevents the service from transitioning its state from the initial state "old" through "stop" to "new". The state transition from "stop" to "new" can only be performed when both the states of AppConf and AppPkg are set to "new".

Next, Constr 601 is described. Constr 601 is a conditional expression for specifying the states which may be passed during a system update, and is referred to as a "transient requirement". The constraint expression uses a variable of the form "e.s" using e, which is the ID of the state element, and s, which is the ID of the state, and this variable changes its value according to the current state of the system, as shown in (1) and (2) below.

(1) If the current state of a state element e is s, then e.s.=1.
(2) If the current state of a state element e is not s, then e.s.=0.

Due to the behavior of this variable, the transient requirement acts as a constraint expression on the current state of the system.

Specific examples of transient requirements are shown. Constr 601 illustrated in FIG. 1 is a constraint expression "Service.stop+Service2.stop≤1" that expresses a transient requirement for the state elements Service and Service2, which represent the startup states of two services. This constraint expression is satisfied if either Service or Service2 is not a stop. Conversely, the constraint expression is violated when both are a stop (in other words, when both services have stopped). In other words, Constr 601 expresses the transient requirement that "during an update, one of the services should remain running".

The above is an overview of the state element model. Next, it is described about the automatic planning on this state element model and the system update procedure planning by it.

Automatic planning in the state element model is the problem of planning the route to be reached by transitions from an initial state to a target state on the state element model. In the state element model, the sufficient conditions for a transition to be feasible are modeled as the dependencies, and the states that can be passed through during the update are modeled as transient requirements. Therefore, if the automatic planning problem is solved for a route that satisfies all the dependencies correctly and does not violate the transient requirements, the obtained route can be used as an "update procedure," which is the solution of the system update procedure planning. In this way, the automatic generation of correct and safe system update procedures can be achieved by the automatic planning problem.

Figure 2:
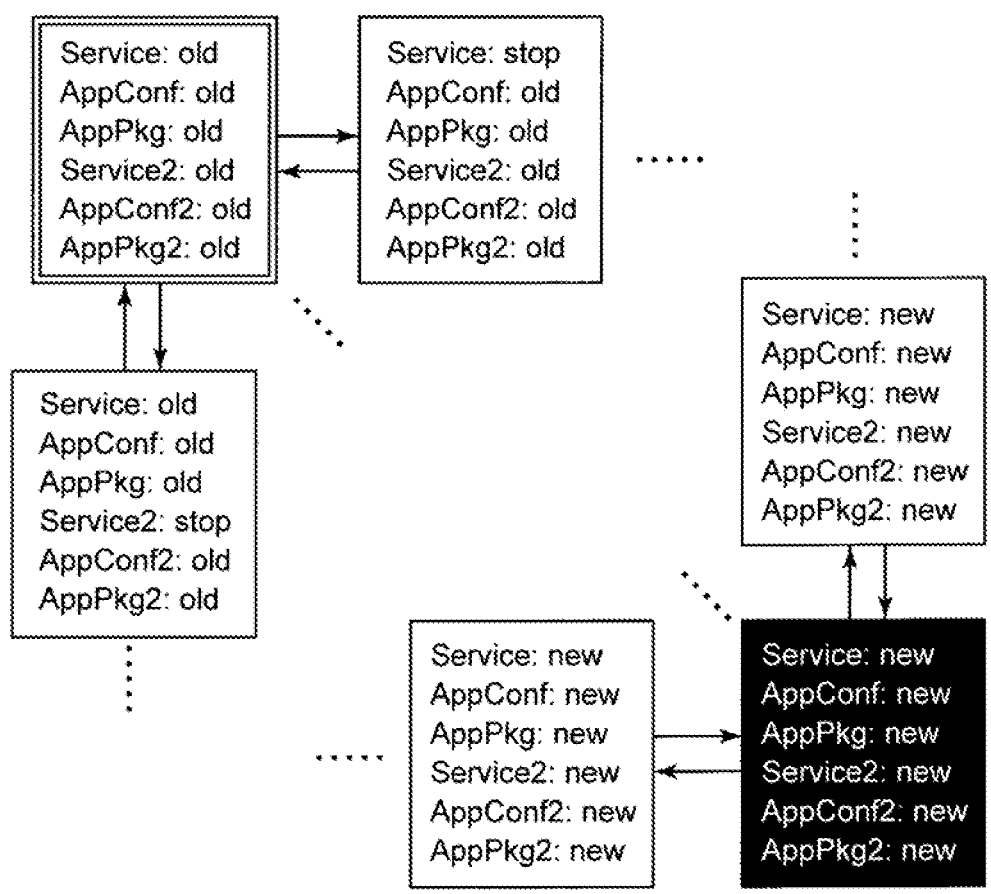
FIG. 2 It depicts a schematic diagram showing transitions of global state.

When solving an automatic planning problem on a certain model, a route search is generally performed in the state space comprising the states of the entire system (global state). The information that shows the state of each state element (each rectangle shown in FIG. 1) in the state element model that represents the system to be updated is called the global state. FIG. 2 shows the transitions of the global state of the system represented by the state element model illustrated in FIG. 1. When solving an automatic planning problem on the state element model, the state space comprising the global states is considered by expressing the state of the entire system as a combination of each state element, and the route of the transition of the global state is searched.

A system is defined as a model consisting of parts. Then, the system defined as a model is expanded and converted into a transition system concerning the state of the whole system when it is solved as an automatic planning problem. In general, the size of this expanded state transition system increases in the exponential order of the number of parts. The method described in PTL 1 limits the input to the automatic planning engine to the "differences" in the system that need to be updated. Since the amount of changes required to the system in a single update is often not so large in reality, focusing only on the differences made it possible to automatically generate procedures for large systems in a realistic time.

However, there are practical cases in which large-scale updates are performed in a single system update. One such case is "an operation to add (hereinafter called "scale-out") or update (hereinafter called "bulk update") a large number of identical subsystems". For example, a "bulk update" is to update the operating system (OS) of all terminals connected to a network, and a "scale-out" is to expand the scale of a system that is responsible for service operation. Since such updates are simple, it is natural to treat them as a "single update", but the automatic planning problem that arises from this is a large-scale one.

Homogeneous subsystems that are added or updated by scale-out or bulk update are hereinafter referred to as "units".

Figure 3:
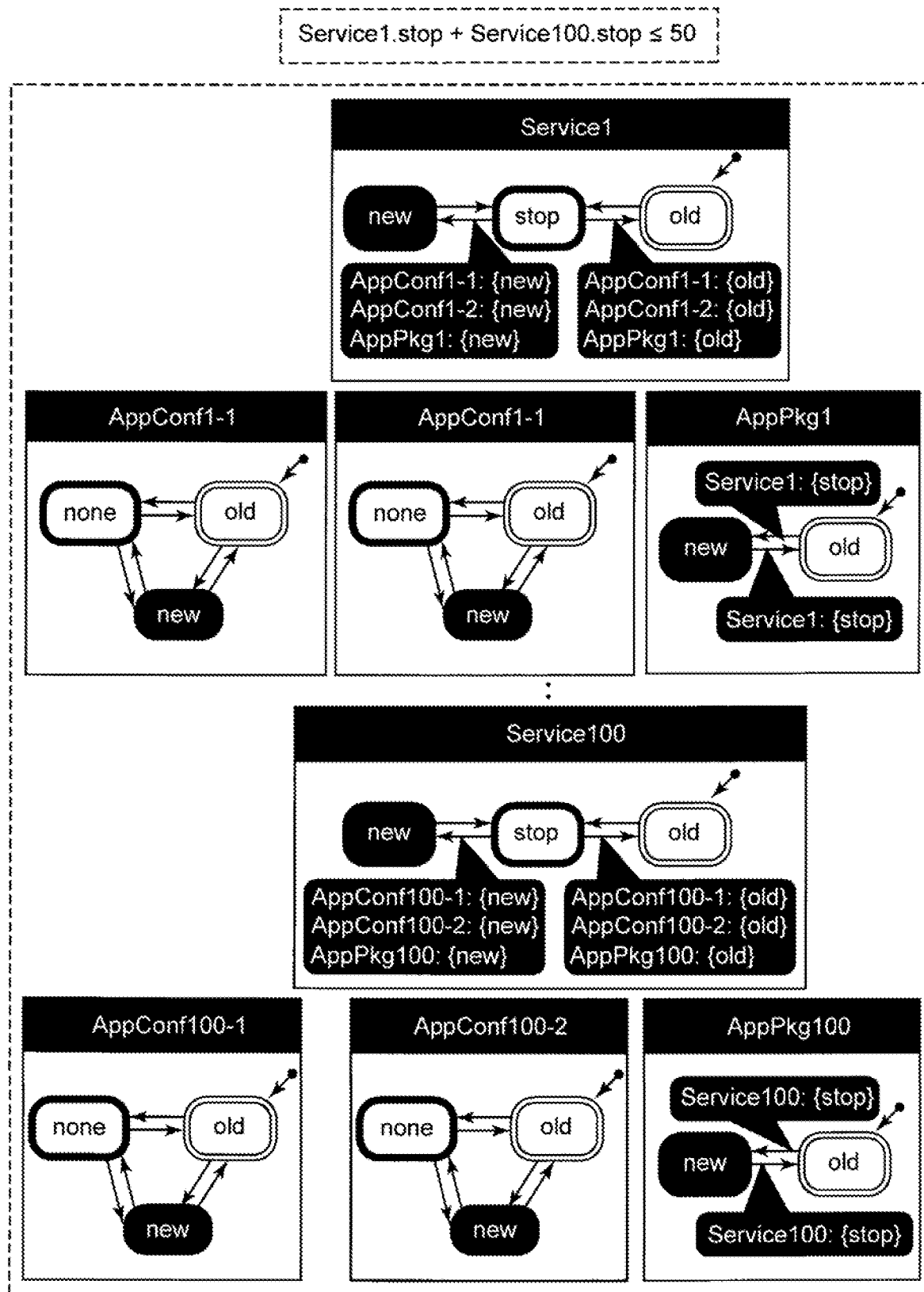
FIG. 3 It depicts a schematic diagram showing an example of a state element model.

FIG. 3 shows an example of a state element model of a system similar to FIG. 1. In the example shown in FIG. 1, the number of services is 2, whereas in the example shown in FIG. 3, the number of services is 100. Also, in the example shown in FIG. 1, the number of configuration files associated with one service is one, whereas in the example shown in FIG. 3, the number of configuration files associated with one service is two. When a single service is viewed as a unit, the example shown in FIG. 1 has two units, whereas the example shown in FIG. 3 has 100 units. If this is simply expanded in the same way as in FIG. 2, the state transition system after the expansion becomes an extremely large-scale problem with a number of states as large as 20 to the 100th power (=approximately 10 to the 130th power).

In order to reduce such an explosive increase in the amount of computation, each unit can be simplified in some way, and the "number of states per unit" can be reduced. For example, a simple method would be to exclude all parts from each unit except those that are referenced from outside. FIG. 4 shows how the automatic planning problem was solved based on this idea. However, the resulting procedure is inappropriate as an update procedure. This is due to the fact that if the relationship between the parts referenced from outside the unit and the parts not referenced from outside the unit is completely severed, there will be no consistency between the "update procedure outside the unit (and the update procedure inside the unit for the referenced parts)" and the "update procedure inside the unit. Therefore, in order to simplify the model with the aforementioned policy of "reducing the number of states in one unit", it is necessary to convert the model so that the "update procedure on the simplified model" is consistent with the "update procedure inside the unit".

In the present invention, the state element model is simplified and a route in the simplified state element model is derived. Then, the route is converted to the route in state element model before simplification to prevent an explosive increase in computational complexity.

Unit is described in more detail. As mentioned above, homogeneous subsystems that are added or updated by scale-out or bulk update are called "units". In more detail, each unit satisfies the following conditions.

The combination of state elements (rectangles illustrated in FIG. 1 and the like) contained in individual units is common to each unit, and the labels contained in each unit are similar labels. Furthermore, the "initial states" of the corresponding state elements contained in the individual units are common, and similarly, the "target states" of the corresponding state elements contained in the individual units are also common.

The "state" within a unit that is referenced from outside the unit is common for each unit. However, the reference source of the state may be different for each unit. Similarly, the "state" within a unit that is referred to from a constraint expression is common to each unit. For example, in the examples shown in FIG. 1 and FIG. 3, the "state" in the unit referenced by the constraint expression is common to the "stop" in the state element "Service".

If a label contained in a unit refers to the "state" of an element outside the unit, the "transition" to which such a label is attached is common to each unit.

These conditions are met by each unit.

The information that indicates the state of each state element contained in a unit is referred to as the "unit global state".

An example embodiments of the present invention are described below with reference to the drawings.

Example Embodiment 1

[Description of the Configuration]

Figure 5:
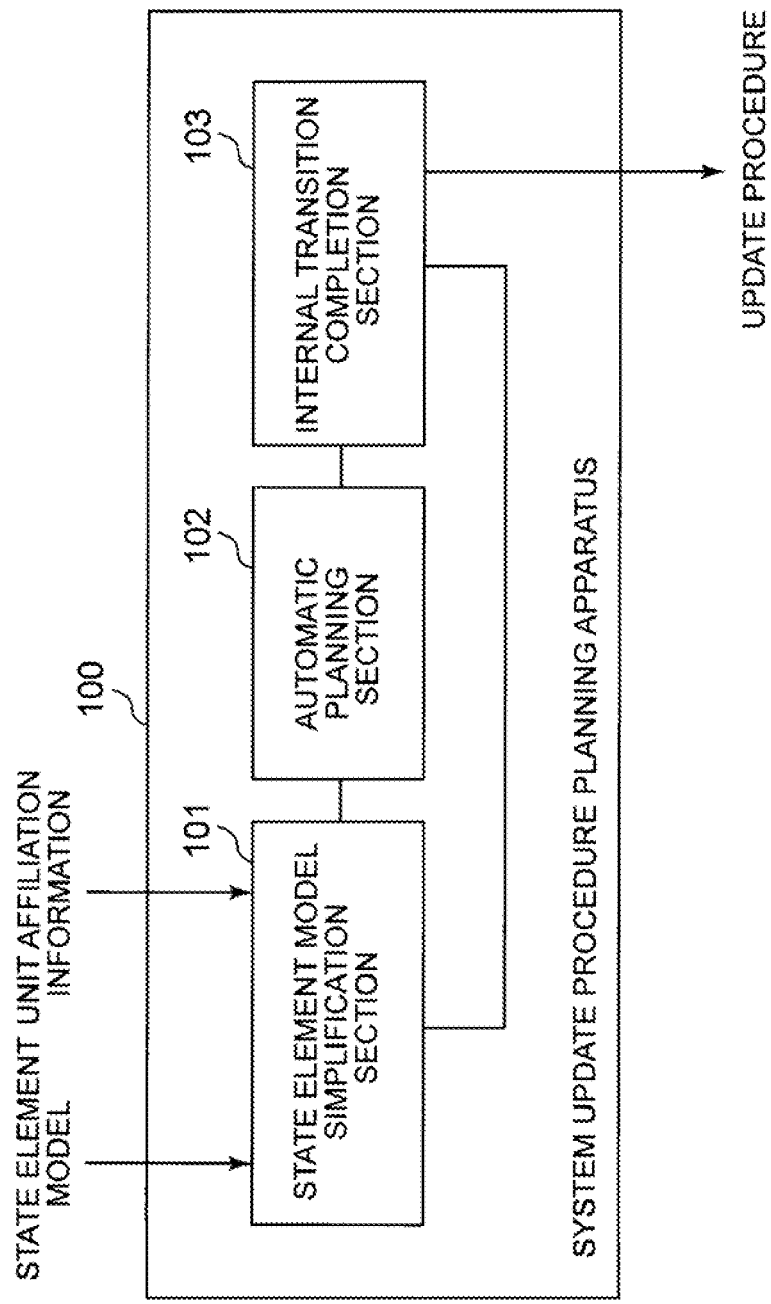
FIG. 5 It depicts a block diagram showing an example of a system update procedure planning apparatus of the first example embodiment of the present invention.

FIG. 5 is a block diagram showing an example of a system update procedure planning apparatus of a first example embodiment of the present invention. The system update procedure planning apparatus 100 of the first example embodiment includes a state element model simplification section 101, an automatic planning section 102, and an internal transition completion section 103.

The system update procedure planning apparatus 100 shown in FIG. 5 receives as input a state element model and unit affiliation information indicating whether each state element included in the state element model "corresponds to a part E[i, j] included in a unit C[i]" or "is not included in any unit", and outputs the update procedure that is the solution of the state element model. The unit affiliation information can be said to be information that indicates to which of a plurality of units each state element in the state element model belongs. By using this unit affiliation information, the following operations (1) and (2) are possible.
(1) The state element model simplification section 101 obtains information from the state element ID that "corresponds to the part E[i, j] included in the unit C[i]" or "is not included in any unit".
(2) The state element model simplification section 101 specifies C[i] and extracts all the included state elements.

The state element model simplification section 101 receives a state element model and unit affiliation information as input, and outputs a simplified model in which each unit included in the state element model has been simplified, and an internal route retention table. The internal route retention table is a table that can refer to a route from Sa to Sb using only the internal state as a key for two different states Sa and Sb belonging to the same unit. An example of an internal route retention table will be described later. In addition, as described below, the internal route retention table is input to the internal transition completion section 103 that performs the operation of restoring the solution of the original state element model from the solution of the simplified model.

The automatic planning section 102 receives the simplified model, which is an output of the state element model simplification section 101, as an input, and outputs a simplified update route that is a solution of the simplified model by a route searching algorithm. The operation of the automatic planning section 102 to derive a route (simplified update route) that is a solution of the simplified model may be realized by a known method. For example, the automatic planning section 102 may derive the route that is the solution of the simplified model by the method described in PTL 2.

The internal transition completion section 103 receives as input the state element model, the simplified update route, which is an output of the automatic planning section 102, and the internal route retention table, which is an output of the state element model simplification section 101, and recovers the update route on the state element model before being simplified from the simplified update route.

With the above configuration, the system update procedure planning apparatus 100 efficiently generates an update route on the original state element model by obtaining and processing the results of the route search on the simplified model.

The state element model simplification section 101, the automatic planning section 102, and the internal transition completion section 103 are realized, for example, by a CPU (Central Processing Unit) of a computer that operates according to a system update procedure planning program. For example, the CPU may read the system update procedure planning program from a program recording medium such as a program storage device of the computer, and operate as the state element model simplification section 101, the automatic planning section 102, and the internal transition completion section 103 according to the program.

[Operation Description]

The following describes, with reference to the drawings, a processing process in which the system update procedure planning apparatus 100 of the present example embodiment outputs an update route.

Figure 6:
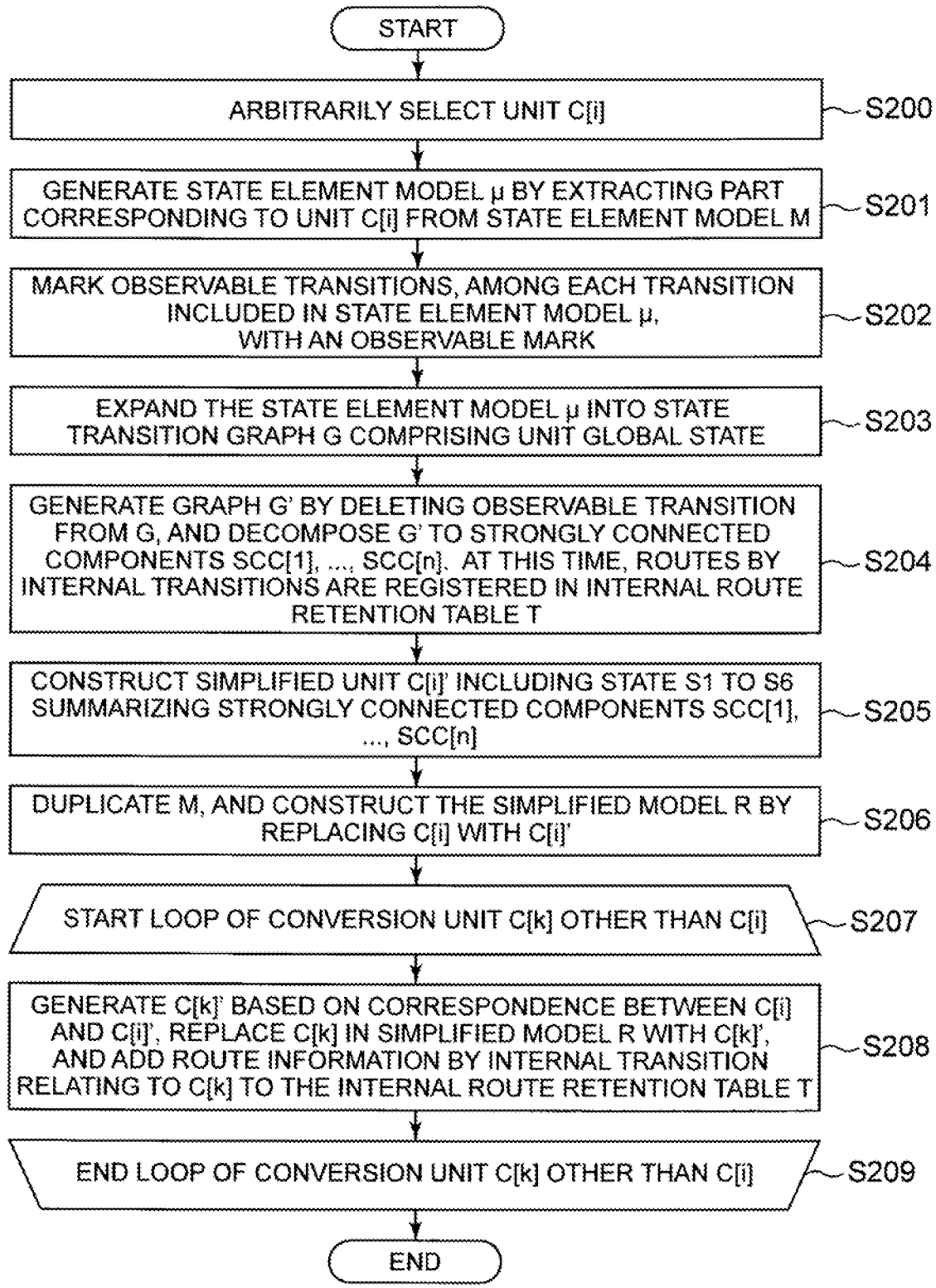
FIG. 6 It depicts a flowchart showing an example of the process of simplifying the state element model by the state element model simplification section.

First, the process of the state element model simplification process by the state element model simplification section 101 is described. FIG. 6 is a flowchart showing an example of the process of simplifying the state element model by the state element model simplification section 101.

Figure 7:
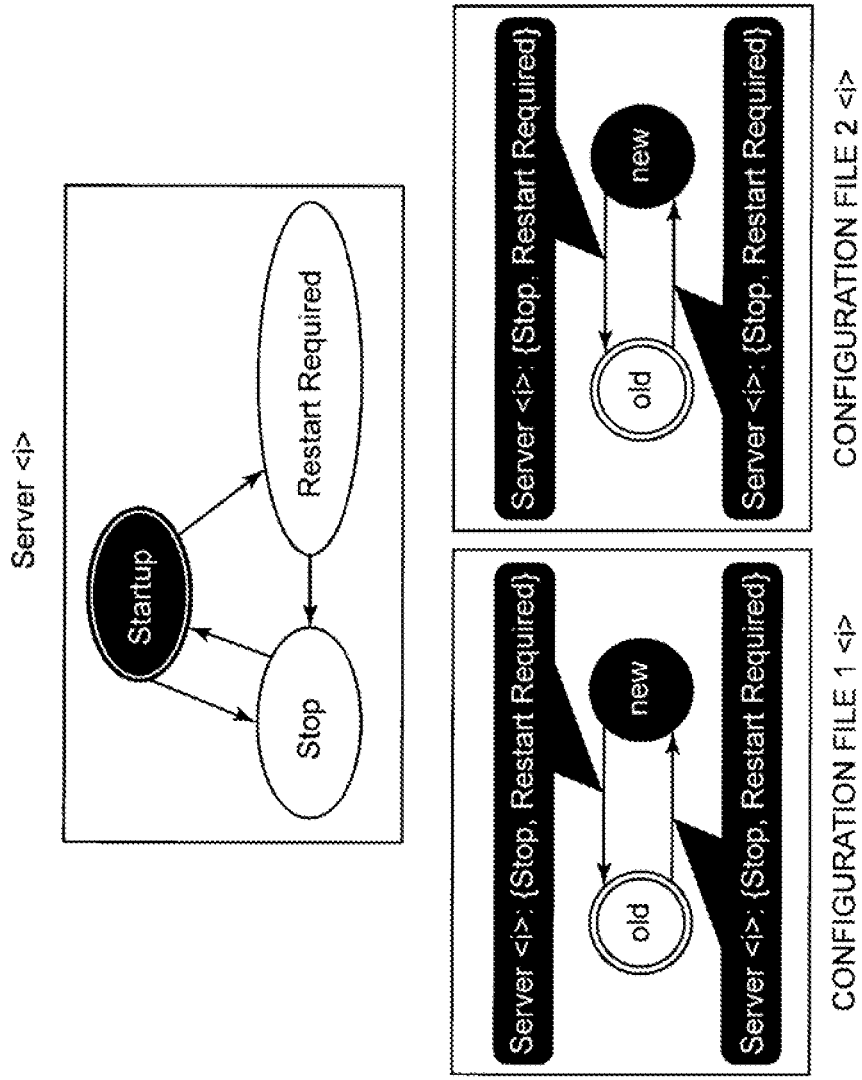
FIG. 7 It depicts a schematic diagram showing an example of a unit.

In the following example, the case where a state element model containing N units shown in FIG. 7 is input is used as an example. It is also assumed that the constraint expression included in the state element model is Equation (1) shown below.

$$\text{Server}\langle 1 \rangle. \text{Startup} + \ldots + \langle N \rangle. \text{Startup} \geq N/2 \tag{1}$$

The i shown in FIG. 7 is a value for distinguishing individual units included in the state element model input to the system update procedure planning apparatus 100. The unit identified by i (e.g., the i-th unit) will be denoted as C[i]. In the drawings below, the value (i) for distinguishing the units may be omitted.

First, the state element model simplification section 101 arbitrarily selects one unit based on the unit affiliation information φ. Since all units are the same, any unit may be selected. Here, it is assumed that C[i] is selected (step S200).

Next, the state element model simplification section 101 extracts, from the input state element model (denoted by the sign M), all the state elements belonging to the unit C[i], and generates a partial state element model of the unit including all the dependencies among these state elements (step S201). This partial state element model is denoted by the sign μ. The state element model μ of unit C[i] is represented as shown in FIG. 7.

Next, the state element model simplification section 101 determines whether all the transitions included in the state element model μ are observable from the outside, and marks all the observable transitions with an "observable mark" (step S202).

An observable transition of a state element (denoted as e) in the state element model meets one of the three criteria [OBS-1], [OBS-2], or [OBS-3] described below.

[OBS-1]

It has at least one dependency record regarding a state element that is not included in C[i].

[OBS-2]

At least one state s, which is depended on by a state element not included in C[i], is a transition source or a transition destination.

[OBS-3]

At least one state s to which the transient requirement refers, is a transition source or a transition destination. Here, the fact that a transient requirement refers to a state s of e simply means that "the constraint expression contains e.s".

Due to the data structure of the state element model, it is easy to determine whether or not each of the three criteria [OBS-1], [OBS-2], and [OBS-3] are met by simply looking at each transition.

Figure 8:
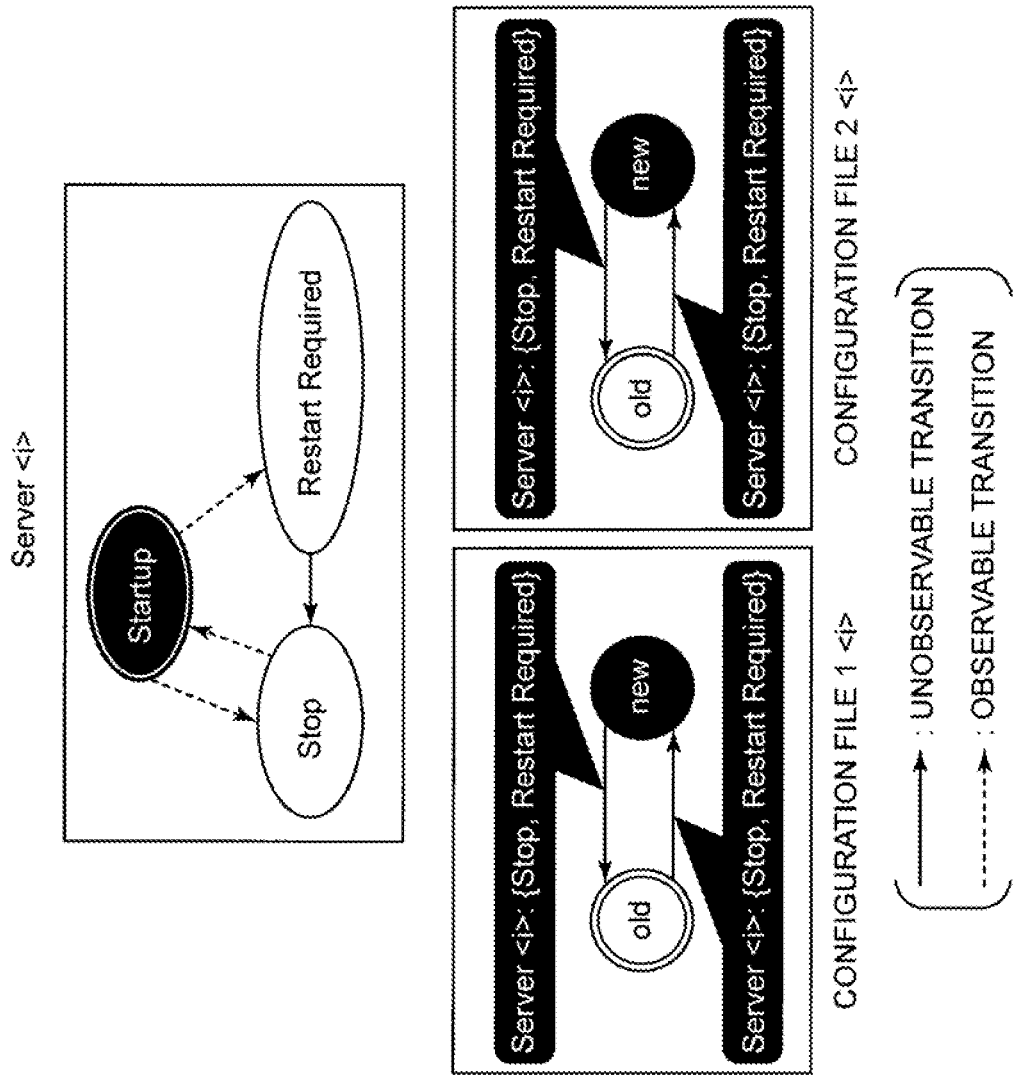
FIG. 8 It depicts a schematic diagram showing an example of the state element model $\mu$ after step S202.

In this example, in the constraint expression (Equation (1) above), reference is made to the state "Server <i>. Startup". Accordingly, the state element model simplification section 101 attaches observable marks to three transitions: "Stop→Startup", which is a transition toward the "Startup"

state of the state element "Server <i>", and "Startup→Stop" and "Startup→Restart Required", which are transitions away from the "Start" state in the opposite direction. In the following drawings, the transitions marked with the observable mark are represented by dashed arrows. An example of the state element model μ after step S202 is shown in FIG. 8.

Next, the state element model simplification section 101 expands the state element model μ (see FIG. 8) into a state transition graph (this graph is denoted by the sign G) showing the transitions of the unit global state of the unit C[i] (step S203). As described above, the unit global state is information that indicates the state of each state element contained in a single unit. Then, the state transition graph G represents the transition of the unit global state.

Figure 9:
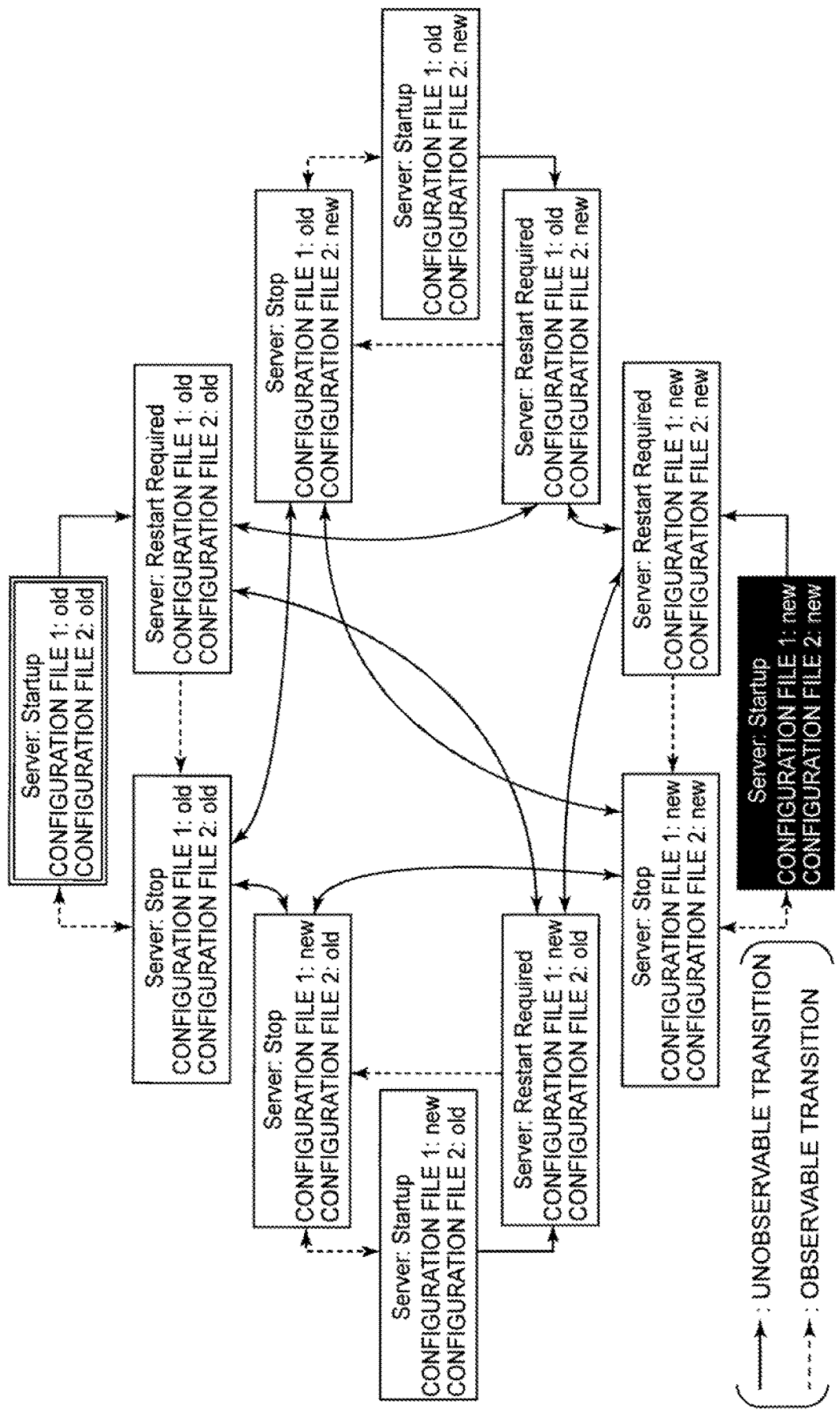
FIG. 9 It depicts a schematic diagram showing an example of a state transition graph obtained in step S203.

An example of the state transition graph G obtained in step S203 is shown in FIG. 9. When the state element model simplification section 101 develops the state transition graph G (see FIG. 9) from the state element model μ (see FIG. 8), the observable marks are inherited by the state transition graph G.

Dependency records that refer to states inside the unit do not remain in the state transition graph G. Dependency records that refer to states outside the unit remain in the state transition graph G. The state element model simplification section 101 determines for each dependency record included in each label whether or not to leave the dependency record in the state transition graph G. If it is determined not to leave the dependency record for each dependency record included in one label, the label can be deleted. In the present example (see FIG. 8), since there is no dependency record referring to a state external to the unit, no label is left in the state transition graph G.

Next to step S203, the state element model simplification section 101 generates a state transition graph (hereinafter, this graph is denoted by the sign G') in which observable transitions (in other words, transitions marked as observable) are deleted from the state transition graph G. Then, the state element model simplification section 101 performs the procedure of decomposition to strongly connected components on the state transition graph G' to obtain the strongly connected components SCC[1], . . . , SCC[m]. At this time, the state element model simplification section 101 maintains information indicating to which SCC[i] (i=1, . . . , m) each unit global state belongs. In addition, the state element model simplification section 101 sequentially registers in the internal route retention table T the routes (by internal transitions) between unit global states included in the same strongly connected component, which were discovered during the procedure of the decomposition to strongly connected components (step S204).

Figure 10:
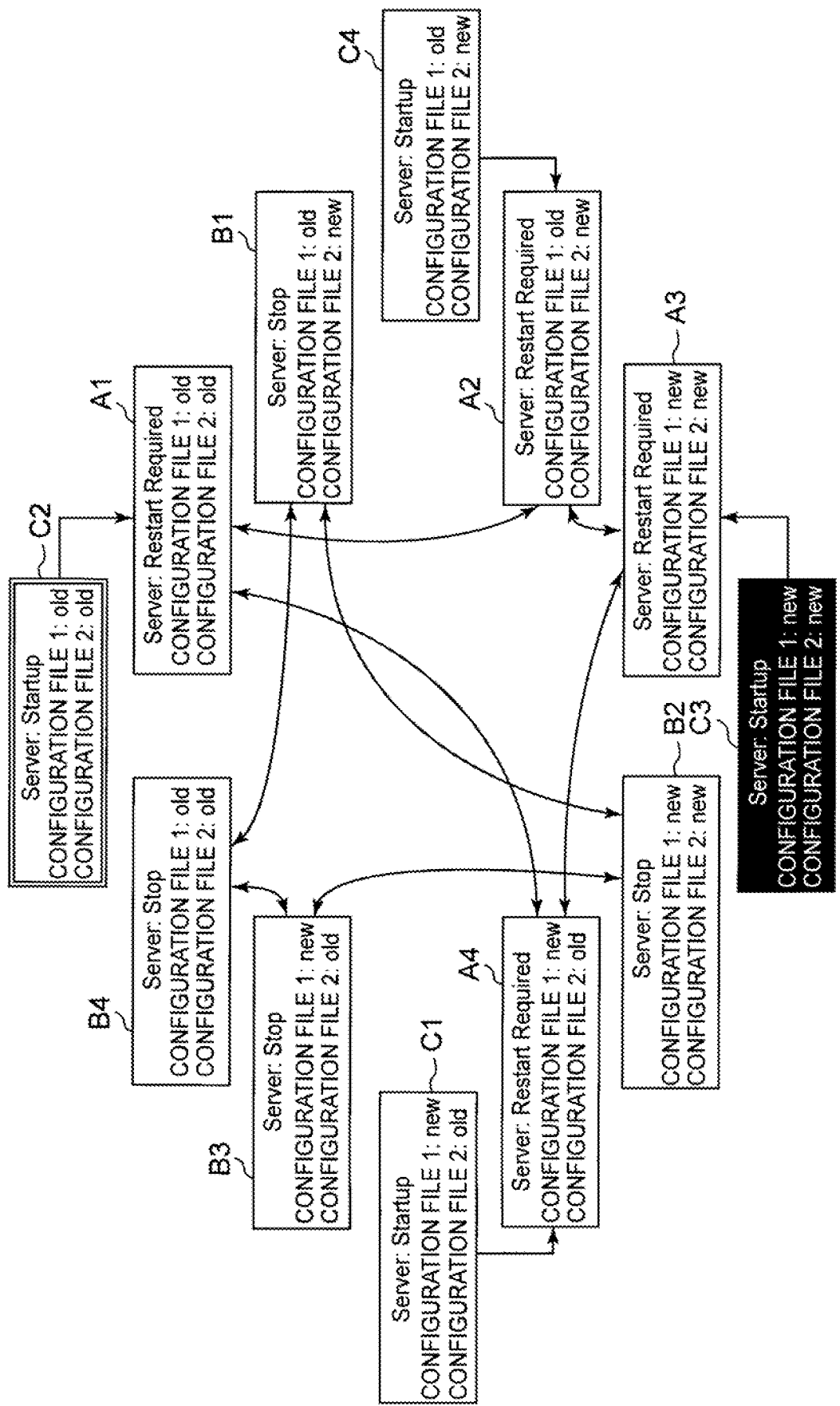
FIG. 10 It depicts a schematic diagram showing an example of a state transition graph with observable transitions removed.

The state transition graph G' with the observable transitions removed is represented as shown in FIG. 10. The state transition graph G' shown in FIG. 10 contains 12 unit global states. In addition, in this example, six strongly connected components are obtained. The strongly connected components have the unit global state as an element. In the example shown in FIG. 10, the first strongly connected component contains element C1; the second strongly connected component contains element C2; the third strongly connected component contains element C3; the fourth strongly connected component contains element C4; in C1 to C4, the state of the state element "Server" is "Startup" in all cases. The fifth strongly connected component includes elements A1 to A4, wherein the state of the state element "Server" is "Restart Required"; the sixth strongly connected component includes elements B1 to B4, wherein the state of the state element "Server" is "Stop".

As described above, the state element model simplification section 101 registers the routes between unit global states included in the same strongly connected component in the internal route retention table T. FIG. 11 is a schematic diagram showing an example of the internal route retention table. The internal route retention table is obtained for each strongly connected component that contains a plurality of elements. The internal route retention table illustrated in FIG. 11 is a table obtained on the basis of strongly connected components containing elements (unit global states) A1 to A4. For a strongly connected component that contains only one element, the internal route retention table need not be generated. As shown in FIG. 11, the internal route retention table is a set of combinations of information corresponding to a "key" and information corresponding to a "value". The information corresponding to a "key" is a combination of a starting point and an end point, and the information corresponding to a "value" is information indicating a specific route from the starting point to the end point. If there are multiple routes leading from the starting point to the end point, any one route from among the multiple routes can be selected as the "value". For the strongly connected components including elements B1 to B4 (see FIG. 10), an internal route retention table is similarly generated. As described above, for the strongly connected component containing only one element, the internal route retention table need not be generated.

Next to step S204, the state element model simplification section 101 constructs the simplified unit C[i]' for the unit C[i] based on the strongly connected component SCC[i] (i=1, . . . , m) obtained in step S204. At this time, the state element model simplification section 101 summarizes the individual strongly connected components SCC[i] (i=1, . . . , m), respectively, into a single element. In this example, six strongly connected components are obtained, and the "states" that summarize the individual strongly connected components are denoted as S1 to S6. When summarizing the strongly connected components having only one unit global state, that one unit global state can be used as one "state". In this example, the aforementioned elements C1, C2, C3, C4 (see FIG. 10) are used as they are, S1, S2, S3, S4. In addition, the "state" that summarizes the strongly connected components (see FIG. 10) including the aforementioned elements A1 to A4 is designated as S6, and the "state" that summarizes the strongly connected components (see FIG. 10) including the aforementioned elements B1 to B4 is designated as S5.

In the following description, any state among the states S1 to S6 is denoted by S[i], S[j]. The state element model simplification section 101 puts a transition t between two states S[i] and S[j] only when "a state transition can be made from any unit global state contained in the strongly connected component SCC[i] that is the basis of S[i] to any unit global state contained in the strongly connected component SCC[j] that is the basis of S[j]". In addition, for the internal transition interpolation process described below, the transitions from S[i] to S[j] are explicitly tagged with the transition t to indicate from which unit global state in SCC[i] they can be executed.

In other words, the unit global state included in the strongly connected component is assigned as a tag to the start and end points of the transition between states S1 to S6. Then, the state transition system S1 to S6 is treated as a single state element with an ID of "C[i]'", which is the simplified unit C[i]' for unit C[i] (Step S205).

Figure 12:
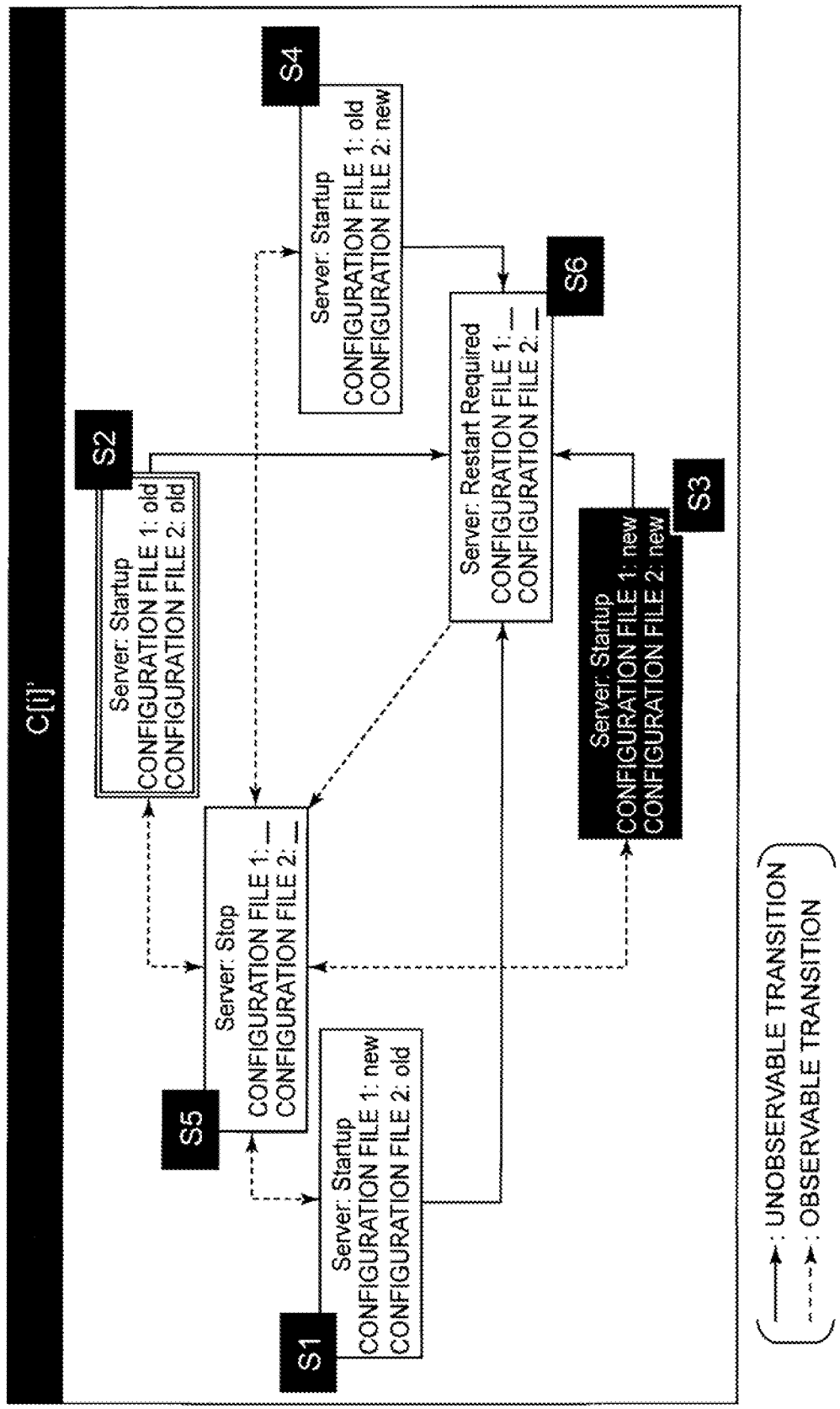
FIG. 12 It depicts a schematic diagram showing an example of a simplified unit.

FIG. 12 is a schematic diagram of the simplified unit C[i]' obtained in the above manner. This state element C[i]' contains only six states S1 to S6. This is half the number of states (unit global states) contained in the state transition graph G shown in FIG. 9. The simplified unit C[i]' consists of one state element.

Next to step S205, the state element model simplification section 101 duplicates the original state element model M, and constructs the simplified model R by replacing the part corresponding to the unit C[i] in the duplicated state element model with the simplified unit C[i]' (step S206). This simplified model is denoted by the sign R.

When making this replacement, if there is a reference to C[i] from outside C[i] or from a transient requirement, it is necessary to reconcile reference by reassigning the appropriate reference, which can be solved as follows, respectively.

If the external transition has a dependency on the state s of the state element e inside C[i], then the state element model simplifier 101 reads this as "the dependency of on the global state S1, . . . , Sk such that the state of the state element e is s", and further "the dependency on the strongly connected components SCC[1], SCC[m] that contain at least one of S1, . . . , Sk in the simplified unit", and rewrite the dependency record. If the dependency on multiple states in C[i] can be resolved by reading the dependency as dependency on a global state such that all dependencies are eliminated.

On the other hand, if there is a reference e.s. to state s of state element e inside C[i] from a transient requirement, similarly, the state element model simplification section 101 will reads this as a "a reference to the global state S1, Sk such that the state of the state element e is s", and further "a reference to the strongly connected components SCC[1], . . . , SCC[m] that contain at least one of S1, . . . , Sk in the simplified unit", and replace the term corresponding to e.s. with (C[i]'.SCC[1]+ . . . , +C[i]'.SCC[m]). Since this replaced term is "1 when the state element e is in state s, 0 otherwise", it is possible to impose the same constraint on the simplified unit as the condition indicated by the original transient requirement.

In the example shown in FIG. 12, a reference to a state "Server.Startup" in the transient requirement is converted to "C[i]'.S1+C[i]'.S2+C[i]'.S3+C[i]'.S4". If the state element "Server" in FIG. 7 is in the "Startup" state, it is in one of the states S1, S2, S3, or S4 (see FIG. 12), so this conversion allows the conditions to remain exactly the same as the original transient requirements after simplification.

Finally, the state element model simplification section 101 replaces other units in the simplified model R with the simplified unit by the same conversion as the conversion from unit C[i] to the simplified unit C[i]'. The only difference between C[i]' and the simplified unit for other units is the ID of the corresponding state element. By referring to the unit affiliation information $\varphi$ and replacing it as appropriate, the conversion from the unit to the simplified unit can be performed without repeating steps S201 to S205 performed for unit C[i]. In addition, the internal route information replaced with the IDs of other units is added to the internal route retention table T. When the replacement of all units has been completed, the simplified model R and the internal route retention table T are output (steps S207 to S209).

In the above steps S202 to S205, the state element model simplification section 101 replaces the unit with another structure such that the behaviors viewed from outside the unit are equivalent. More specifically, the state element model simplification section 101 converts the unit into a state transition system comprising global states viewed from the entire unit, and then summarizes the states that can come and go by transitions that are not observed from outside.

In the above step S206 and steps S207 to S209, the state element model simplification section 101 simplifies the state element model M before simplification by replacing each unit with a different structure that is more simplified.

Next, the automatic planning section 102 will be described. The automatic planning section 102 is capable of generating a route on the state element model that satisfies the transient requirements. The method by which the automatic planning section 102 generates the route may be a known method, for example, the method described in PTL 2.

Since the simplified model generated by the state element model simplification section 101 has a form as a state element model in itself, the automatic planning section 102 can output a route on the simplified model.

Next, the process of the internal transition completion process by the internal transition completion section 103 is described. The route output by the automatic planning section 102 is a route on the simplified model, and the internal transition completion section 103 converts this route into a route on the original state element model.

Figure 13:
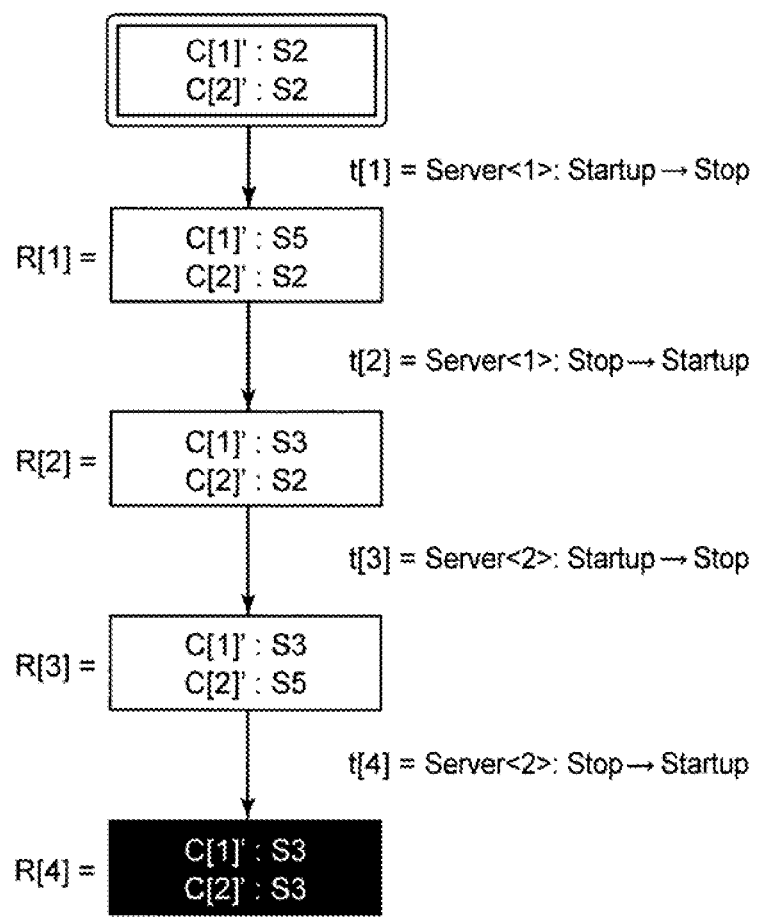
FIG. 13 It depicts a schematic diagram showing an example of a route on a simplified model.

It is assumed to denote each transition in the route on the simplified model by t[i] (i=1, . . . , n). In addition, as described below, the global state on the simplified model that is the "destination" of each transition t[i] is denoted by R[i]. FIG. 13 is a schematic diagram showing an example of a route on the simplified model, represented using t[i] and R[i]. FIG. 14 is a schematic diagram showing a specific example of a part of the internal route retention table.

Figure 15:
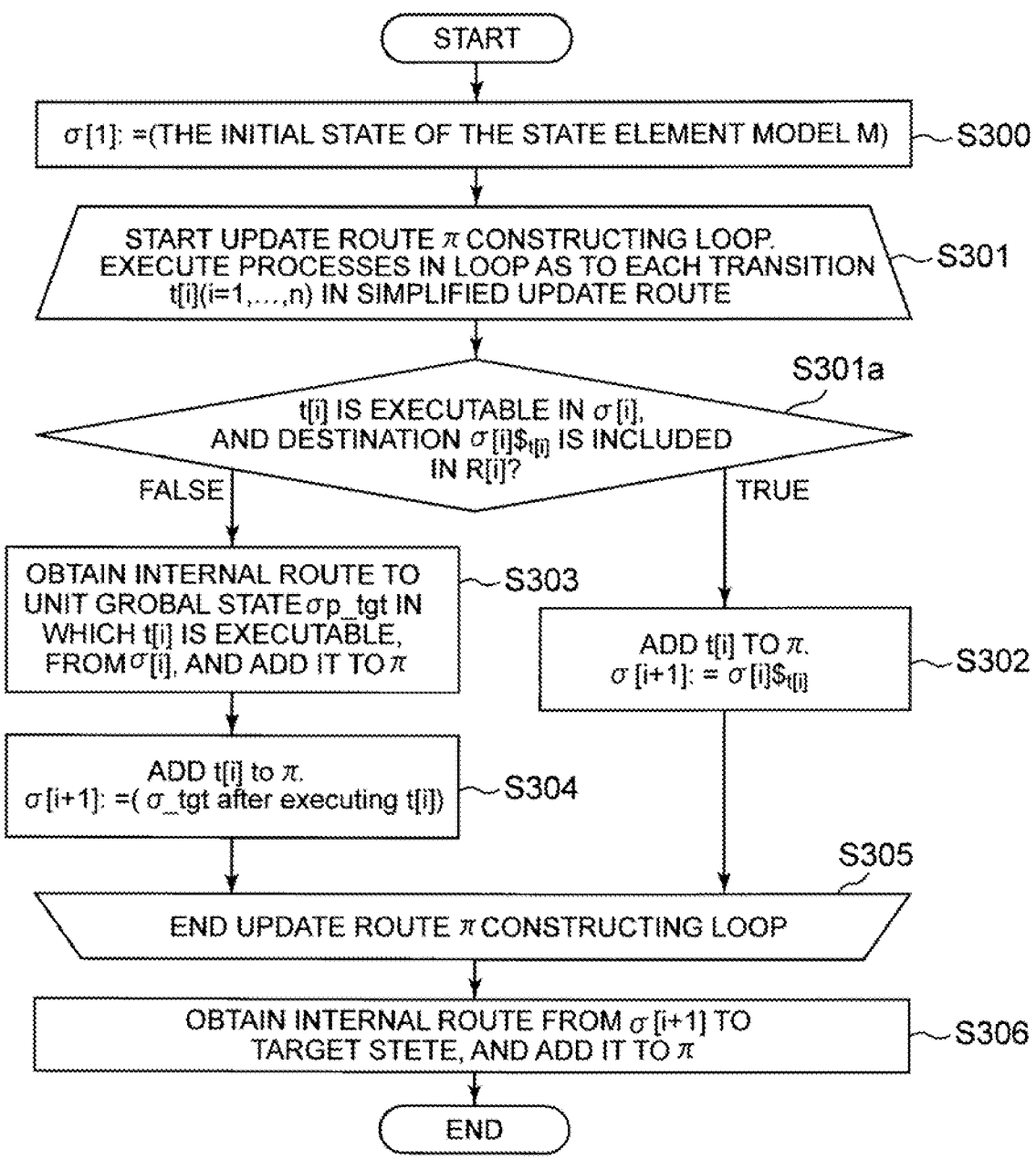
FIG. 15 depicts a flowchart showing the details of the operation of the internal transition completion section 103.

FIG. 15 is a flowchart showing details of the operation of the internal transition completion section 103. The internal transition completion process of the internal transition completion section 103 operates by receiving the original state element model M, the simplified update route which is an output of the automatic planning section 102, and the internal route retention table which is an output of the state element model simplification section 101. Hereinafter, for the purpose of explanation, the simplified update route is referred to by "transitions t[1], t[2], . . . , t[n] used in the state transition". In other words, the simplified update route is a route that reaches the target state of the simplified model by sequentially executing and transitioning transitions t[i] from the initial state. For the sake of explanation, the global state on the simplified model that is the "destination" of each transition t[i] is denoted by R[i].

First, the internal transition completion section 103 sets σ[1] as the initial state of the state element model M (step S300). Here, the initial state of the state element model M means a global state in which the current state points to the initial state in all state elements included in the state element model, respectively. Similarly, the target state of the state element model M means the global state in which the current state points to the target state, respectively, in all state elements included in the state element model.

Next, the internal transition completion section 103 repeats steps S302 to S304 while sequentially extracting the transitions included in the simplified update route from t[1] to t[n]. The update route is sequentially assembled in this iterative process. The update route to be obtained is denoted by the sign π. In each iteration that operates by taking out t[i], σ[i] has already been identified by the previous iteration (Step S301).

For each t[i] and σ[i], the internal transition completion section 103 determines whether or not t[i] is executable in σ[i], and if it is executable, determines whether or not the destination σ[i]$_{t[i]}$ is included in R[i] (Step S301a). As described above, the destination when the transition t[i] is executed at σ[i] is denoted by the sign σ[i]$_{t[i]}$. Here, the global state of the simplified model represented by R[i] corresponds to the set of one or more global states of the original state element model. In other words, "σ[i]$_{t[i]}$ is included in R[i]" shall be said to refer to the fact that σ[i]$_{t[i]}$ is included in the set of global states of the original model corresponding to R[i].

If the transition t[i] is executable in the state σ[i] and σ[i]$_{t[i]}$ is included in R[i] (True in step S301a), then the internal transition completion section 103 sets σ[i+1] to σ[i]$_{t[i]}$, adds t[i] to the update route π, and then returns to the iterative procedure at the back to the beginning (step S302).

On the other hand, if the transition t[i] is inexecutable in the state σ[i], or if σ[i]$_{t[i]}$ is not included in R[i] even if it is executable (false in step S301a), the internal transition completion section 103 moves to a procedure of transitioning to state in which t[i] is executable and the state after execution is included in R, by supplementing the internal transition. In the following, the condition that "t[i] is executable and the state after execution is included in R [i]" for the global state σ will be described as "t[i] is regularly executable in σ".

Since the simplified update route is the correct route on the simplified model, the transition t[i] is executable on the simplified model. Furthermore, the transition t[i] is tagged with a tag that indicates in which unit global state it is executable. Let the unit global state indicated by this tag be σp_tgt.

If the current unit global state of the unit that contained the transition t[i] (denoted by C[j]) is consistent with the unit global state σp_tgt above, it can be said that t[i] is executable and its state after execution is contained in R[i]. Therefore, in order to transition, from σ[i], t[i] to a regularly executable state, it is only needed to transition the part of σ[i] corresponding to C[j] to the state represented by σp_tgt.

Accordingly, the internal transition completion section 103 first extracts the part σp_src corresponding to σ[i], retrieves "the route by the internal transition from σp_src to σp_tgt" from the internal route retention table, and adds all the retrieved routes to π (step S303).

Thereafter, the internal transition completion section 103 makes the state to which the state σ_tgt is transitioned by t[i] σ[i+1], the state σ_tgt is a state in which the part corresponding to C[j] of the state σ[i] is replaced by the state represented by σp_tgt. The internal transition completion section 103 adds t[i] to the update route π and then returns to the beginning of the iterative procedure (step S304).

After completing the iterative procedure (step S305), the internal transition completion section 103 checks whether a part corresponding each unit C[i] (i=1, . . . , n) of the global state σ[n+1] is consistent with the target state. If there is no match, the route that fill the difference between σ[n+1] and the target state are taken from the internal route retention table in the same manner as in step S303, and all are added to π (step S306).

After all the processing is done, the update route π is the correct update procedure on the state element model M, so it is output.

Figure 16:
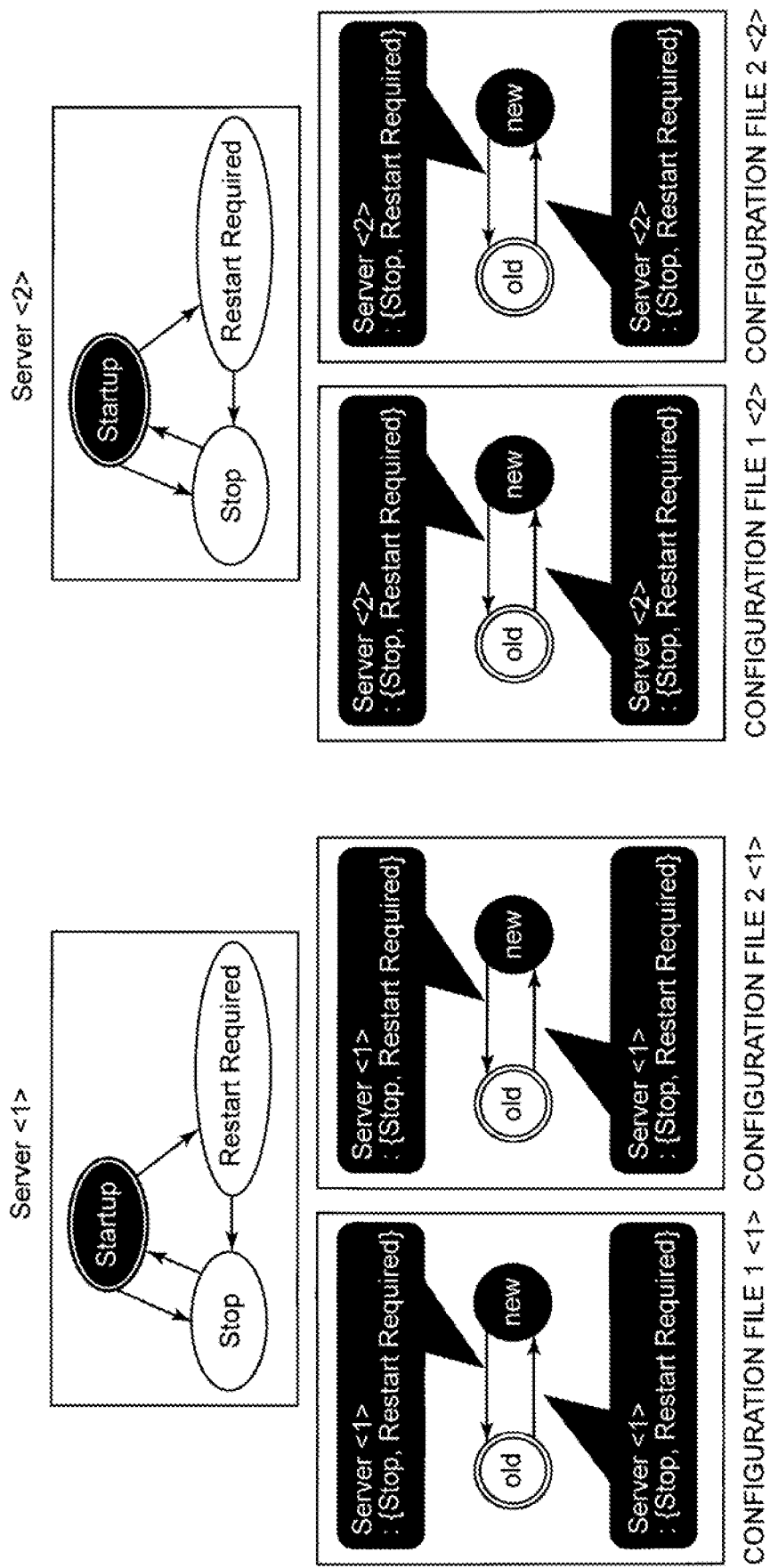
FIG. 16 It depicts a figure showing an example of a problem where two units shown in FIG. 7 exist and the transient requirement is that one of the two servers must be in the startup state.

A specific example of the operation of the internal transition completion section 103 will be described using the drawings. FIG. 16 is an example of the problem where two units shown in FIG. 7 exist and requiring one of the two servers to be in a startup state as a transient requirement. To distinguish between the two units, the respective state elements are distinguished as server <1>, server <2>, and states as S1 <1>, S1 <2>, and the like. The unit in this problem is similar to the unit shown in FIG. 7 and can be simplified to the state elements (simplified units) shown in FIG. 12. The simplified unit obtained from the two units shown in FIG. 16 is distinguished as C[1]', C[2]'. The aforementioned details shown in FIG. 13 are consistent with the specific examples shown below.

When the problem is solved on this simplified model, the route that results in the solution is t[1], t[2], t[3], and t[4] shown in FIG. 13. t[1] corresponds to "Server <1>: Startup→Stop". t[2] corresponds to "Server <1>: Stop→Startup". t[3] corresponds to "Server <2>: Startup→Stop". t[4] corresponds to "Server <2>: Stop→Startup".

Also, let R[i] be the destination state of t[i]. As shown in FIG. 13, R[1] becomes "C[1]': S5, C[2]': S2"; R[2] becomes "C[1]':S3, C[2]': S2"; R[3] becomes "C[1]':S3, C[2]' S5"; R[4] becomes "C[1]':S3, C[2]':S3".

Figure 17:
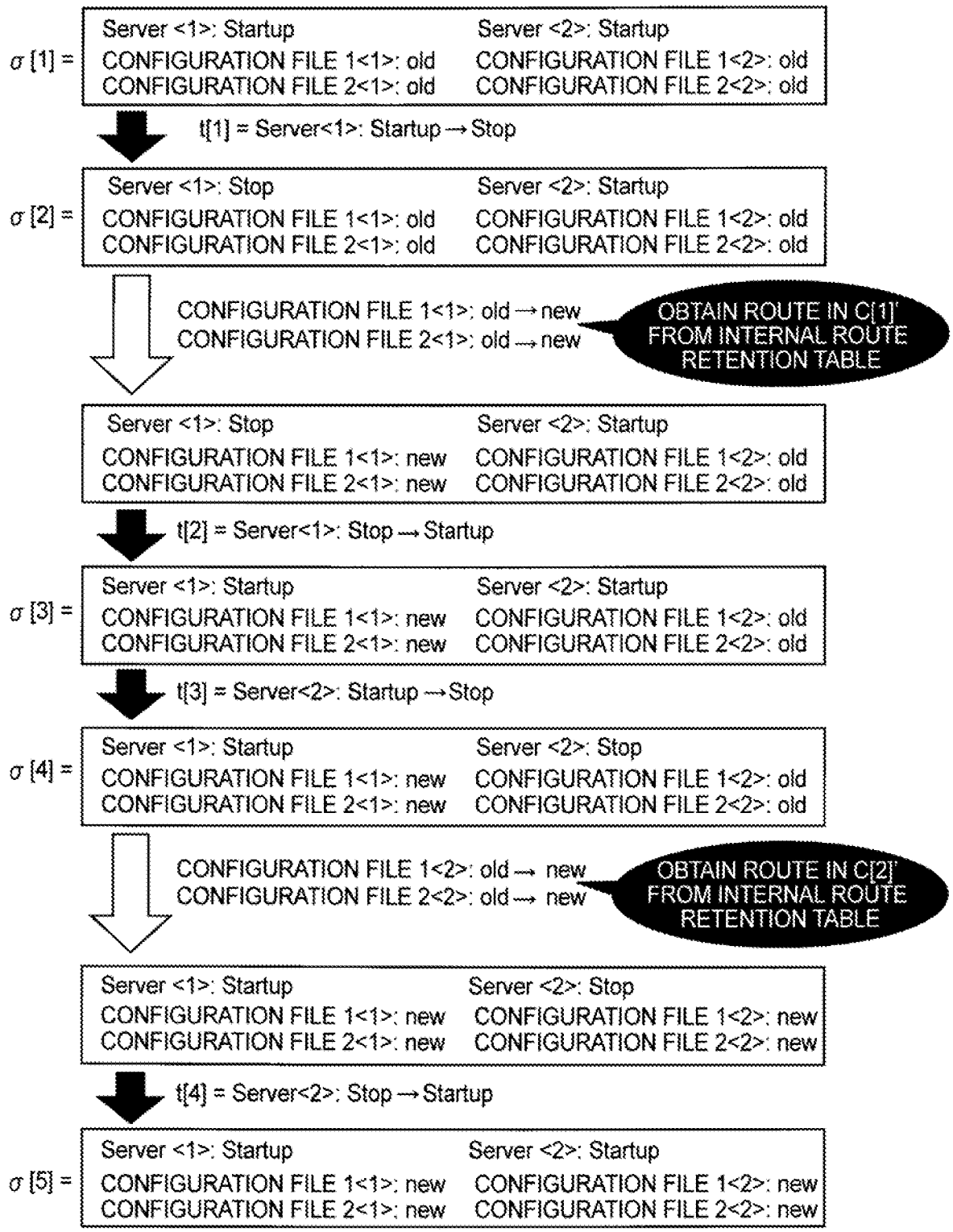
FIG. 17 It depicts a figure showing an example of converting a route on a simplified model to a route on the original state element model.

FIG. 17 illustrates how the feasibility of the route shown in FIG. 13 is sequentially examined and transformed into the route on the original state element model M shown in FIG. 16. The process is described in the following.

First, σ[1] is set to the initial state of M "Server <1>: Startup, configuration file 1 <1>: old, configuration file 2 <1>: old, Server <2>: Startup, configuration file 1 <2>: old, configuration file 2 <2>: old", and the sought update route π is set to an empty list.

The σ[1]$_{t[1]}$ obtained by applying t [1] is "Server <1>: Stop, configuration file 1 <1>: old, configuration file 2 <1>: old, Server <2>: Startup, configuration file 1 <2>: old, configuration file 2 <2>: old". Since this is included in R[1], σ[2] is set to σ[1]$_{t[1]}$ and t[1] is added to π (see FIG. 17).

Next, t[2] can be executed in 6[2]. However, the destination σ[2]$_{t[2]}$ is "server <1>: Startup, configuration file 1 <1>: old, configuration file 2 <1>: old, Server <2>: Startup, configuration file 1 <2>: old, configuration file 2 <2>: old", which is not included in R[2]. Therefore, the internal transition completion section 103 refers to the tag of t[2]. Here, the unit global state of C'[1] that can be assigned as the tag of t[2] is "Server <1>: Stop, configuration file 1 <1>: new, configuration file 2 <1>: new". Therefore, in the internal route retention table for C'[1], when the route from "Server <1>: Stop, configuration file 1 <1>: old, configuration file 2 <1>: old" to "Server <1>: Stop, configuration file 1 <1>: new, configuration file 2 <1>: new" is queried, the result is "configuration file 1 <1>: old to new" and "configuration file 2 <1>: old to new" are obtained, the internal transition completion section 103 adds these to the π. Then, the internal transition completion section 103 sets "Server <1>: Stop, configuration file 1 <1>: new, configuration file 2 <1>: new, Server <2>: Startup, configuration file 1 <2>: old, configuration file 2 <2>: old" to σ[3] and adds t[2] to π.

Figure 18:
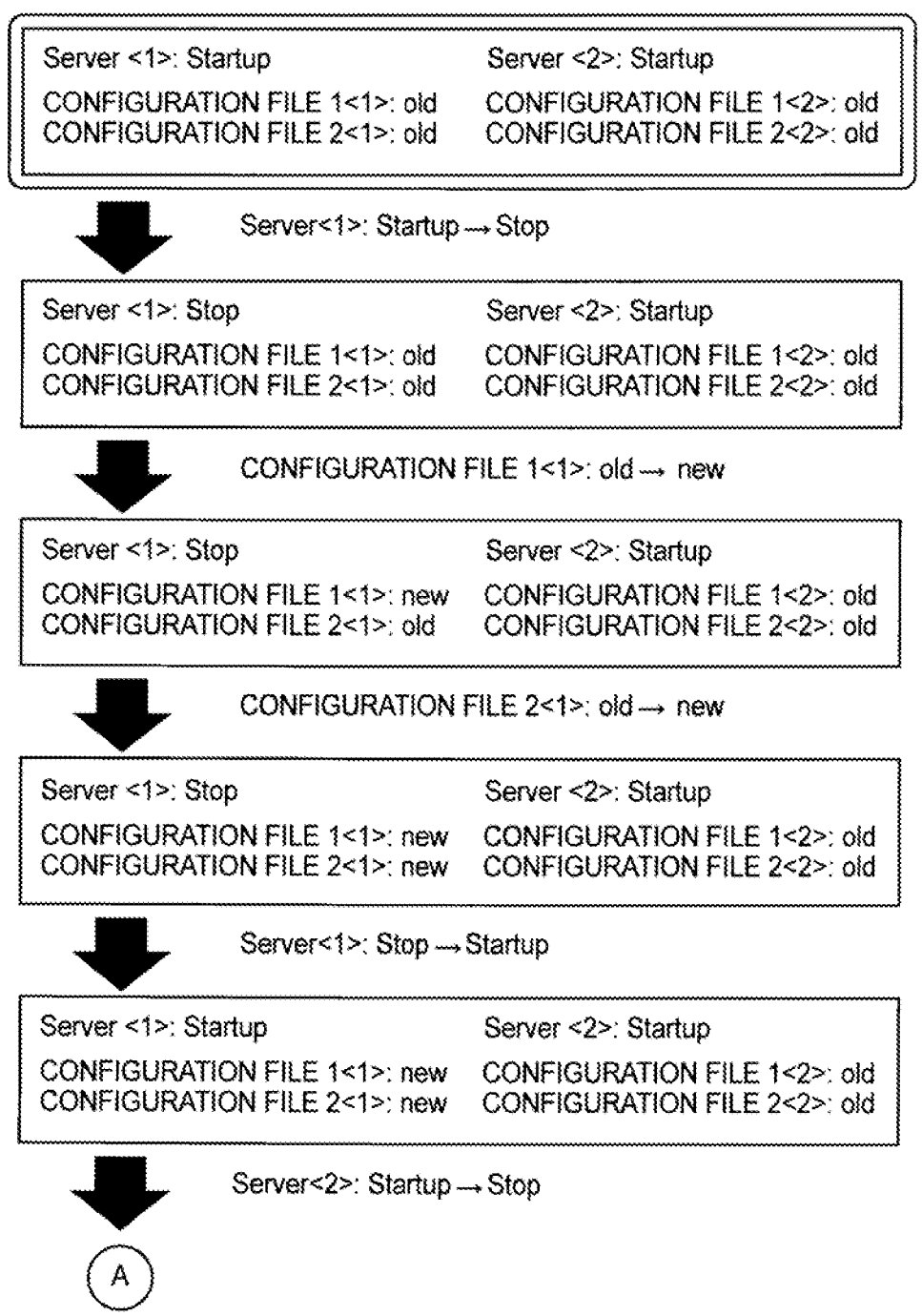
FIG. 18 It depicts a figure showing an example of a route on the original state element model obtained by the first example embodiment.
Figure 19:
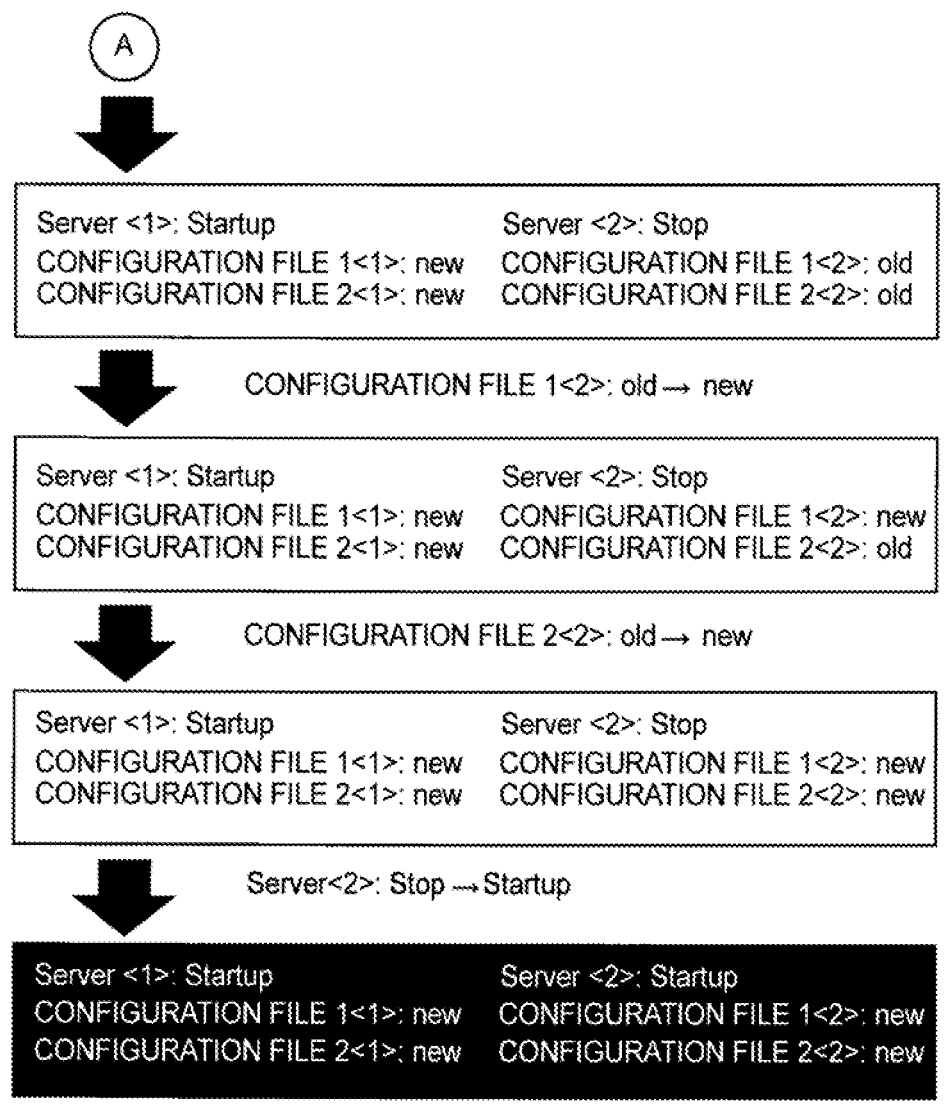
FIG. 19 It depicts a figure showing an example of a route on the original state element model obtained by the first example embodiment.

In the following, σ[4] and σ[5] can be obtained in the same way. σ[5] is consistent with the target state of the original model. Therefore, the above procedure can finally obtain the route π on the state element model M as shown in FIGS. 18 and 19.

In the above steps S301 to S305, the internal transition completion section 103 completes, for the route on the simplified state element model, the internal transitions necessary to execute the route on the state element model before the simplification, thereby converting the route into a route that can be executed on the state element model before the simplification. More specifically, the internal transition completion section 103 checks whether all the transitions included in the route on the simplified state element model can be executed on the state element model before the simplification, and for the transitions that cannot be executed, it completes the route to the executable state corresponding to the said transition by referring to the internal route retention table.

[Description of Effect]

The system update procedure planning apparatus 100 of this example embodiment applies simplification based on unit configuration information to a state element model representing a system update, and solves an automatic planning problem on the simplified state element model.

Then, the system update procedure planning apparatus 100 converts the solution to the solution of the original problem with little effort and outputs it. This realizes efficient automatic generation of update procedures for a large-scale problem that involves updating a large number of similar configurations. Therefore, an explosive increase in the amount of computation can be prevented when solving the automatic planning problem in system update.

The state element model simplification section 101 realizes a simplification process of a state element model representing a system update based on the external observability of transitions in the model. Also, by using the strong connectivity due to unobservable transitions, it is guaranteed that the solution of the model after simplification can be restored to the solution of the original model by appropriately completion for the route omitted by the simplification.

The internal transition completion section 103 converts the solution on the simplified model to the solution of the original problem in a simple way without procedure generation or other search processes, by using the information obtained during the model simplification process of the state element model simplification section 101.

Example Embodiment 2

[Description of the Configuration]

A second example embodiment of the present invention will be described below with reference to the drawings. The second example embodiment is one in which some changes are made to the configuration of the first example embodiment so as to add a unit configuration detection function that can detect unit affiliation information from a state element model, which was input to the system update procedure planning apparatus 100 in the first example embodiment.

Figure 20:
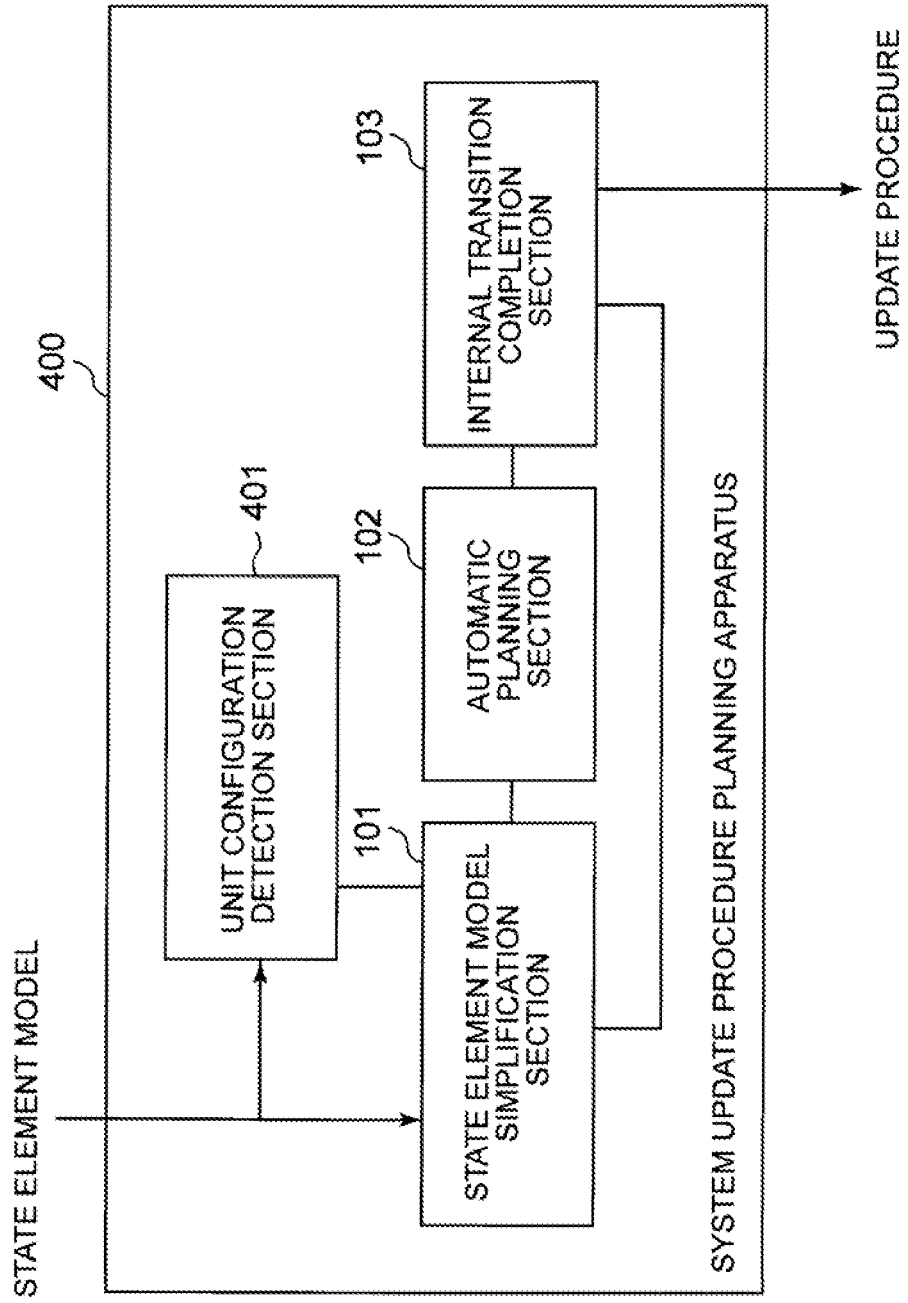
FIG. 20 It depicts a block diagram showing an example of a system update procedure planning apparatus of the second example embodiment of the present invention.

FIG. 20 is a block diagram showing an example of a system update procedure planning apparatus of a second example embodiment of the present invention. Elements similar to those provided by the system update procedure planning apparatus 100 in the first example embodiment are marked with the same sign as in FIG. 5 and explanation of these elements are omitted.

The system update procedure planning apparatus 400 of the second example embodiment includes a state element model simplification section 101, an automatic planning section 102, an internal transition completion section 103, and a unit configuration detection section 401. The state element model simplification section 101, the automatic planning section 102, and the internal transition completion section 103 are the same as the state element model simplification section 101, the automatic planning section 102, and the internal transition completion section 103 in the first example embodiment.

However, whereas in the first example embodiment, the input to the state element model simplification section 101 is a state element model and unit affiliation information given externally, in the second example embodiment, the input to the state element model simplification section 101 is a state element model given externally and unit affiliation information output by the unit configuration detection section 401.

In this example embodiment, the only input to the system update procedure planning apparatus 400 is the state element model.

The unit configuration detection section 401 takes a state element model as an input, calculates unit affiliation information on the given state element model, and outputs the information. As already described, the unit affiliation information can be said to be information indicating to which of a plurality of units each state element in the state element model belongs.

The unit configuration detection section 401, the state element model simplification section 101, the automatic planning section 102, and the internal transition completion section 103 are realized, for example, by a CPU of a computer that operates according to a system update procedure planning program. For example, the CPU may read the system update procedure planning program from a program recording medium such as a program storage device of the computer, and operate as the unit configuration detection section 401, the state element model simplification section 101, the automatic planning section 102, and the internal transition completion section 103 according to the program.

[Operation Description]

Figure 21:
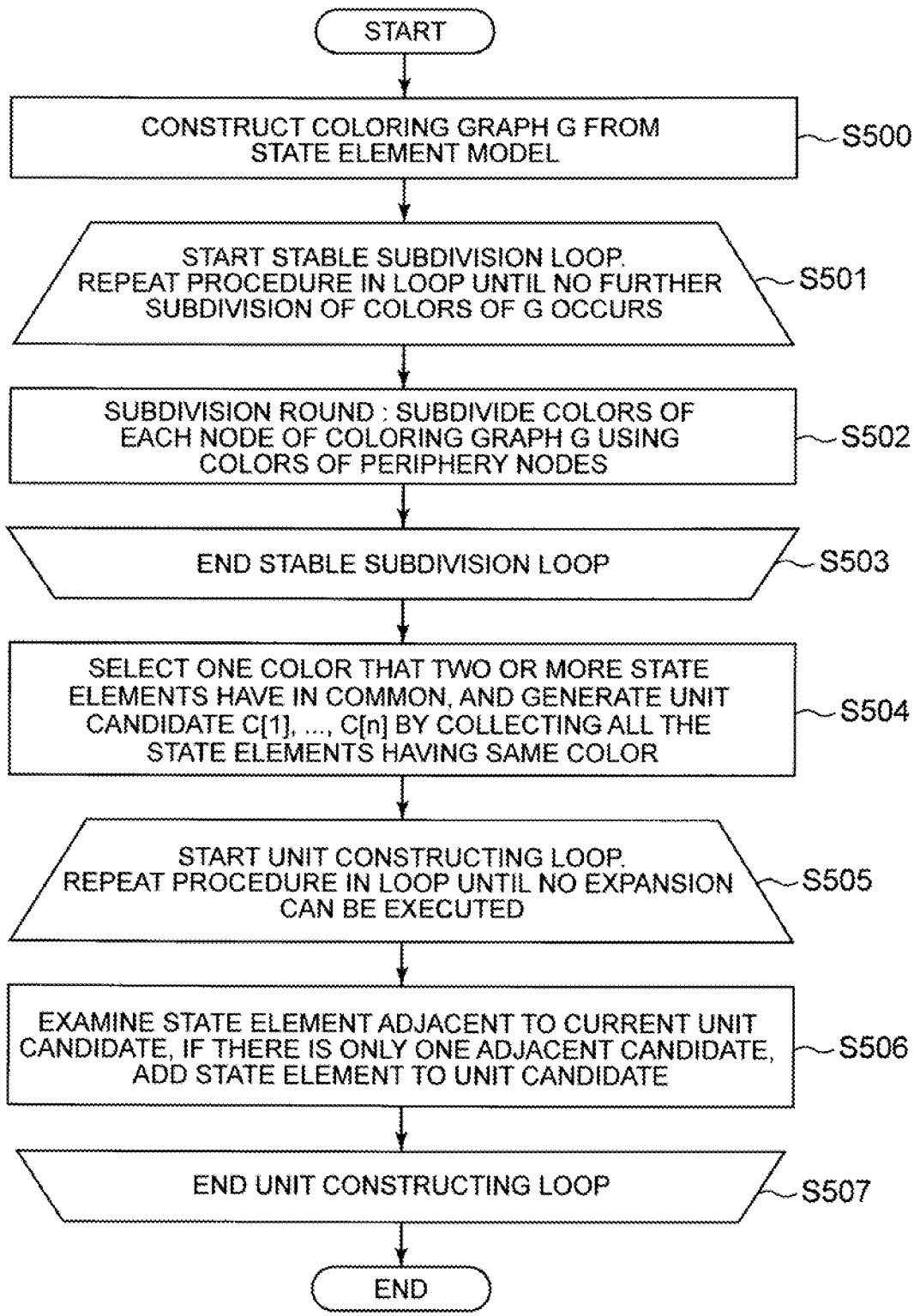
FIG. 21 It depicts a flowchart showing an example of the processing process of the unit configuration detection section.

Since the operations of the state element model simplification section 101, the automatic planning section 102, and the internal transition completion section 103 are the same as those in the first example embodiment, they will not be described here. In the following, the processing process of the unit configuration detection section 401 is described. FIG. 21 is a flowchart showing an example of the processing process of the unit configuration detection section 401. The unit configuration detection section 401 operates by receiving a state element model given from outside as an input.

First, the unit configuration detection section 401 considers the state element model to be a graph such that "the vertices are state elements and the edges are dependency records". Further, the unit configuration detection section 401 colors each vertex by "the form of the internal state transition system and the reference from the transient requirement" and colors the edges by "the transition to which the dependency record is attached and the value of the dependency record itself" to construct a coloring graph G (step S500). Here, the coloring graph obtained in step S500 is denoted by the sign G.

The unit configuration detection section 401 performs a stable subdivision (stable refinement, or naive vertex refinement) procedure for colors of a coloring graph G. Specifically, the unit configuration detection section 401 repeats a procedure called a subdivision round (steps S501 to S503) until no further subdivision of colors (nodes that were originally the same color become different colors after the subdivision round) occurs. The above "subdivision round" is defined as "a subdivision round of generating a label that summarizes the color c of a vertex and the adjacent vertex colors $c[1], c[2], \ldots, c[n]$, and reassigning a new color to each vertex based on the label".

The unit configuration detection section 401 selects one color in the coloring graph G that two or more state elements have in common (step S504).

The unit configuration detection section 401 defines the state elements corresponding to the selected colors as initial unit candidates C[1], ..., C[n], respectively. In subsequent procedures, the unit configuration detection section 401 aims to expand these units as much as possible by adding another state element to them.

The unit configuration detection section 401 examines, for the current unit candidates C[1], ..., C[n], elements to which a state element contained therein refers or are referred to by a dependency record (hereinafter simply referred to as an "related element"). When all of them have been examined, if there is an element that is related to a unit C[i] but not to any other unit, the unit configuration detection section 401 adds the element to the unit C[i] (steps S505 to S507).

At the end of step S506, if even one element has been added to the unit candidate, the unit configuration detection section 401 repeats step S506 once more. Otherwise, the unit configuration information is generated from the current unit candidates and output.

There are multiple colors that can be selected in step S504. However, no matter which color is selected from the multiple candidates, the following procedures (including later procedures such as the graph simplification process and automatic planning) will operate correctly. Therefore, there is no particular restriction on how to select a color here. Also, after the system update procedure planning apparatus 400 tries each of the plurality of colors and confirms the effect of the simplification, the unit configuration detection section 401 may finally select the color that has the best effect of the simplification.

In the above steps S500 to S507, the unit configuration detection section 401 detects two or more structurally identical subconfigurations in the state element model, interprets the two or more structurally identical subconfigurations as units, and then outputs as the unit affiliation information which unit each state element belongs to. More in detail, the unit configuration detecting unit 401 considers the state element model as a coloring graph in step S501, and detects the state elements which can be regarded as structurally identical by obtaining stable subdivision in steps S501 to S503. Then, in steps S505 to S507, the unit configuration detection section 401 determines a unit to which each state element can be regarded as belonging based on the detection results.

[Description of Effect]

The present example embodiment is similar to the first example embodiment except that the unit configuration detection section 401 generates the unit affiliation information. Accordingly, the same effect as that of the first example embodiment is obtained.

The unit configuration detection section 401 detects a plurality of "unit" structures having a similar configuration from the state element model and outputs a correspondence between the structures and the state elements. This allows the user to obtain the information necessary to simplify the state element model without explicitly specifying the information of the units.

Figure 22:
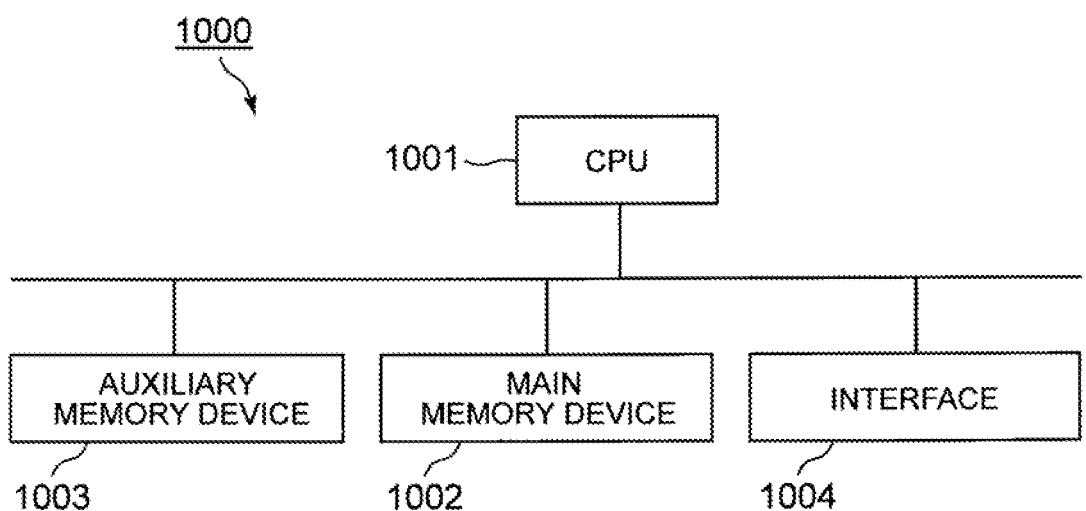
FIG. 22 It depicts a schematic block diagram showing an example configuration of a computer for a system update procedure planning apparatus of each example embodiment of the present invention.

FIG. 22 is a schematic block diagram showing an example configuration of a computer for a system update procedure planning apparatus of each example embodiment of the present invention. The computer 1000 has a CPU 1001, a main memory device 1002, an auxiliary memory device 1003, and an interface 1004.

The system update procedure planning apparatus of each example embodiment of the present invention is realized by a computer 1000. The operation of the system update procedure planning apparatus is stored in the auxiliary memory device 1003 in the form of a system update procedure planning program. The CPU 1001 reads the system update procedure planning program from the auxiliary memory device 1003, expands it to the main memory device 1002, and executes the processes described in the above example embodiments according to the system update procedure planning program.

The auxiliary memory device 1003 is an example of a non-transitory tangible medium. Other examples of a non-transitory tangible medium include a magnetic disk, an optical magnetic disk, a CD-ROM (Compact Disk Read Only Memory), a DVD-ROM (Digital Versatile Disk Read Only Memory), semiconductor memory, and the like. When the program is delivered to the computer 1000 by a communication line, the computer 1000 receiving the delivery may expand the program into the main memory device 1002 and execute the processing described in each of the above example embodiments according to the program.

Some or all of each of the components may be realized by general purpose or dedicated circuitry, processors, or combinations thereof. These may comprise a single chip or a plurality of chips connected via a bus. Some or all of each component may be realized by a combination of the above-described circuitry, etc. and a program.

When some or all of each component is realized by a plurality of information processing apparatuses, circuits, or the like, the plurality of information processing apparatuses, circuits, or the like may be centrally located or distributed. For example, the information processing apparatuses, circuits, and the like may be implemented as a client-and-server system, a cloud computing system, and the like, each of which is connected via a communication network.

Figure 23:
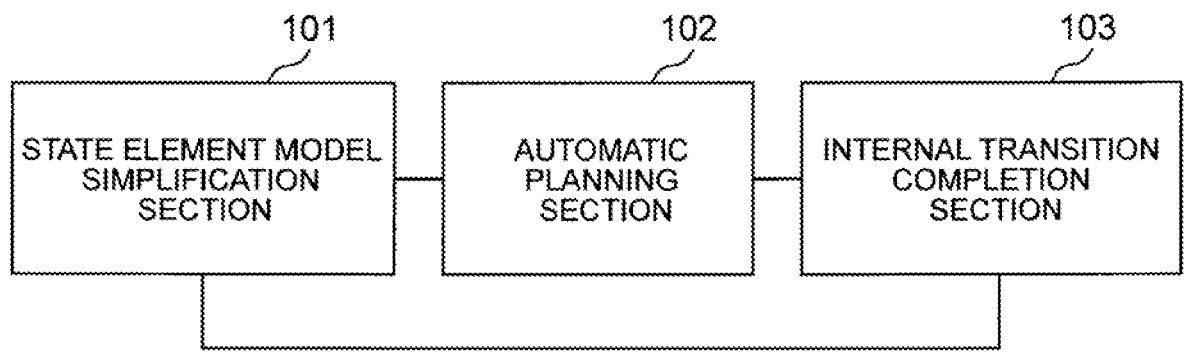
FIG. 23 It depicts a block diagram showing an overview of the system update procedure planning apparatus of the example embodiment of the present invention.

Next, an overview of the present invention will be described. FIG. 23 is a block diagram showing an overview of a system update procedure planning apparatus of an example embodiment of the present invention. The system update procedure planning apparatus of an example embodiment of the present invention outputs an executable route on a state element model as a system update procedure, based on the state element model describing a system update by a plurality of state elements and a constraint expression specified with the plurality of state elements, unit affiliation information indicating to which of a plurality of units each state element in the state element model belongs. The system update procedure planning apparatus includes a state element model simplification section 101, an automatic planning section 102, and an internal transition completion section 103.

The state element model simplification section 101 outputs a simplified state element model by applying a simplification transformation based on the unit affiliation information to the state element model.

The automatic planning section 102 outputs an executable route, for the simplified state element model, from an initial state thereof to a target state.

The internal transition completion section 103 converts the executable route from the initial state to the target state on the simplified state element model into the executable route from an initial state to a target state on the state element model before simplification.

According to such a configuration, an explosive increase in the amount of computation can be prevented when solving an automatic planning problem in system update.

Figure 24:
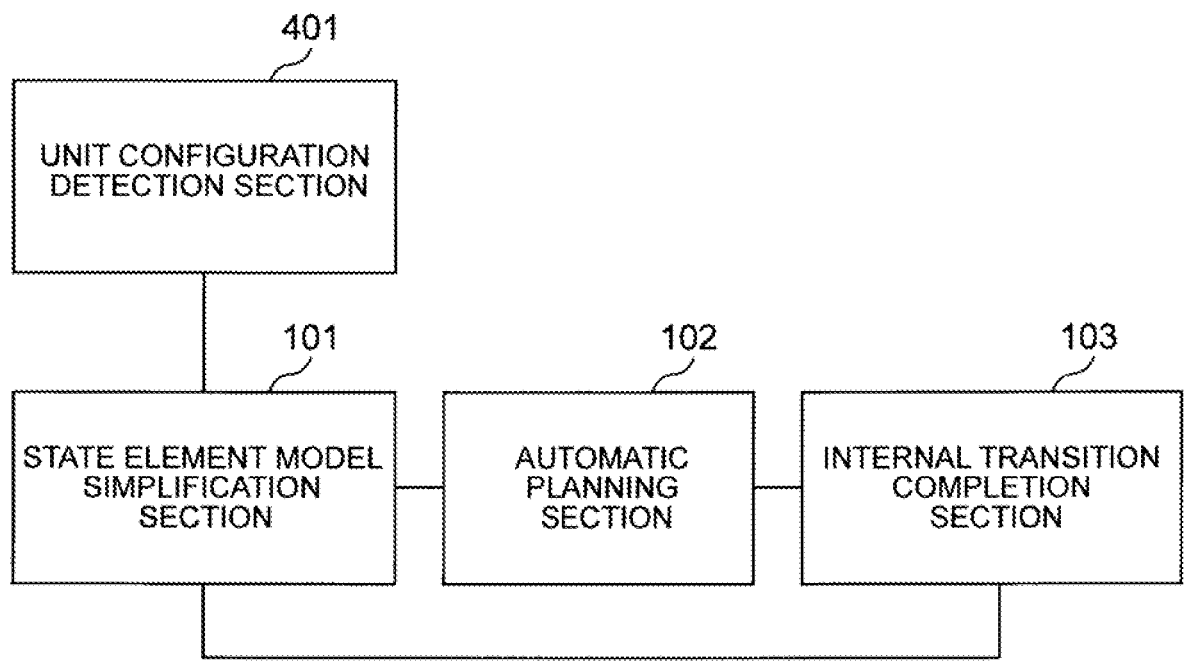
FIG. 24 It depicts a block diagram showing another example of an overview of the system update procedure planning apparatus of the example embodiment of the present invention.

FIG. 24 is a block diagram showing another example of an overview of a system update procedure planning apparatus of an example embodiment of the present invention. The system update procedure planning apparatus of this example outputs an executable route on a state element model as a system update procedure, based on the state element model describing a system update by a plurality of state elements and a constraint expression specified with the plurality of state elements. The system update procedure planning apparatus in this example includes a unit configuration detection section 401, a state element model simplification section 101, an automatic planning section 102, and an internal transition completion section 103.

The unit configuration detection section 401 takes the state element model as input and outputs unit affiliation information indicating to which of a plurality of units each state element in the state element model belongs.

The state element model simplification section 101, the automatic planning section 102 and the internal transition completion section 103 are the same as those elements shown in FIG. 23.

The example embodiments of the invention described above may also be described as in the following supplementary notes, but are not limited to (Supplementary note 1) A system update procedure planning apparatus for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs,
the system update procedure planning apparatus comprising:
a state element model simplification section that outputs a simplified state element model by applying a simplification transformation based on the unit affiliation information to the state element model;
an automatic planning section that outputs an executable route, for the simplified state element model, from an initial state thereof to a target state; and
an internal transition completion section that converts the executable route from the initial state to the target state on the simplified state element model into the executable route from an initial state to a target state on the state element model before simplification.

(Supplementary note 2) A system update procedure planning apparatus for outputting an executable route on a state element model as a system update procedure, based on the state element model describing a system update by a plurality of state elements and a constraint expression specified with the plurality of state elements,
the system update procedure planning apparatus comprising:
a unit configuration detection section that takes the state element model as input and outputs unit affiliation information indicating to which of a plurality of units each state element in the state element model belongs,
a state element model simplification section that outputs a simplified state element model by applying a simplification transformation based on the unit affiliation information to the state element model;
an automatic planning section that outputs an executable route, for the simplified state element model, from an initial state thereof to a target state; and
an internal transition completion section that converts the executable route from the initial state to the target state on the simplified state element model into the executable route from an initial state to a target state on the state element model before simplification.

(Supplementary note 3) The system update procedure planning apparatus according to supplementary note 1 or 2,
wherein the state element model simplification section simplifies the state element model before simplification by replacing each unit with a different, more simplified structure based on the unit affiliation information.

(Supplementary note 4) The system update procedure planning apparatus according to supplementary note 3,
wherein the state element model simplification section simplifies the state element model before simplification by replacing each unit with a different structure such that a behavior viewed from outside the unit is equivalent.

(Supplementary note 5) The system update procedure planning apparatus according to supplementary note 4,
wherein the state element model simplification section simplifies the state element model by converting each unit into a state transition system comprising global states viewed from entire unit, and then summarizing states that can come and go by transitions that are not observed from outside.

(Supplementary note 6) The system update procedure planning apparatus according to any one of supplementary notes 1 to 5,
wherein the internal transition completion section completes, for the route on the simplified state element model, internal transitions necessary to execute the route on the state element model before simplification, thereby converts the route into the executable route on the state element model before simplification.

(Supplementary note 7) The system update procedure planning apparatus according to supplementary note 6,
wherein the state element model simplification section generates internal route retention table that holds information on some of the simplified state transitions in addition to the simplified state element model, and
the internal transition completion section
checks whether all the transitions included in the route on the simplified state element model can be executed on the state element model before simplification, and completes, for the transitions that cannot be executed, route to the executable state corresponding to the transition by referring the internal route retention table, thereby converts the route into the executable route on the state element model before simplification.

(Supplementary note 8) The system update procedure planning apparatus according to supplementary note 2,
wherein the unit configuration detection section
detects two or more structurally identical subconfigurations in the state element model, interprets the two or more structurally identical subconfigurations as units, and outputs as the unit affiliation information which unit each state element belongs to.

(Supplementary note 9) The system update procedure planning apparatus according to supplementary note 8,
wherein the unit configuration detection section
considers the state element model as a coloring graph, detects the state elements which can be regarded as structurally identical by obtaining stable subdivision, and determines a unit to which each state element can be regarded as belonging based on detection results.

(Supplementary note 10) A system update procedure planning method for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning method comprising:

outputting a simplified state element model by applying a simplification transformation based on the unit affiliation information to the state element model;

outputting an executable route, for the simplified state element model, from an initial state thereof to a target state; and converting the executable route from the initial state to the target state on the simplified state element model into the executable route from an initial state to a target state on the state element model before simplification.

(Supplementary note 11) A system update procedure planning method for outputting an executable route on a state element model as a system update procedure, based on the state element model describing a system update by a plurality of state elements and a constraint expression specified with the plurality of state elements, the system update procedure planning method comprising:

taking the state element model as input and outputting unit affiliation information indicating to which of a plurality of units each state element in the state element model belongs;

outputting a simplified state element model by applying a simplification transformation based on the unit affiliation information to the state element model;

outputting an executable route, for the simplified state element model, from an initial state thereof to a target state; and converting the executable route from the initial state to the target state on the simplified state element model into the executable route from an initial state to a target state on the state element model before simplification.

(Supplementary note 12) A computer-readable recording medium in which a system update procedure planning program is recorded, the system update procedure planning program being executed on a computer for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning program causing the computer to perform:

a state element model simplification process of outputting a simplified state element model by applying a simplification transformation based on the unit affiliation information to the state element model;

an automatic planning process of outputting an executable route, for the simplified state element model, from an initial state thereof to a target state; and an internal transition completion process of converting the executable route from the initial state to the target state on the simplified state element model into the executable route from an initial state to a target state on the state element model before simplification.

(Supplementary note 13) A computer-readable recording medium in which a system update procedure planning program is recorded, the system update procedure planning program being executed on a computer for outputting an executable route on a state element model as a system update procedure, based on the state element model describing a system update by a plurality of state elements and a constraint expression specified with the plurality of state elements, the system update procedure planning program causing the computer to perform:

a unit configuration detection process of taking the state element model as input and outputting unit affiliation information indicating to which of a plurality of units each state element in the state element model belongs;

a state element model simplification process of outputting a simplified state element model by applying a simplification transformation based on the unit affiliation information to the state element model;

an automatic planning process of outputting an executable route, for the simplified state element model, from an initial state thereof to a target state; and an internal transition completion process of converting the executable route from the initial state to the target state on the simplified state element model into the executable route from an initial state to a target state on the state element model before simplification.

While the present invention has been described with reference to the example embodiments, the present invention is not limited to the aforementioned example embodiments. Various changes understandable to those skilled in the art within the scope of the present invention can be made to the structures and details of the present invention.

This application claims priority based on Japanese patent application 2019-102388 filed on May 31, 2019, the entire disclosure of which is hereby incorporated herein.

INDUSTRIAL APPLICABILITY

The present invention is suitably applied to automatic planning problems in system update.

REFERENCE SIGNS LIST 100, 400 System update procedure planning apparatus
101 State element model simplification section
102 Automatic planning section
103 Internal transition completion section
401 Unit configuration detection section

What is claimed is:

1. A system update procedure planning apparatus for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs, the system update procedure planning apparatus comprising:

a state element model simplification section that outputs a simplified state element model by applying a simplification transformation based on the unit affiliation information to the state element model;

an automatic planning section that outputs an executable route, for the simplified state element model, from an initial state thereof to a target state; and an internal transition completion section that converts the executable route from the initial state to the target state on the simplified state element model into the executable route from an initial state to a target state on the state element model before simplification.

2. The system update procedure planning apparatus according to claim 1,
wherein the state element model simplification section simplifies the state element model before simplification by replacing each unit with a different, more simplified structure based on the unit affiliation information.

3. The system update procedure planning apparatus according to claim 2,
wherein the state element model simplification section simplifies the state element model before simplification by replacing each unit with a different structure such that a behavior viewed from outside the unit is equivalent.

4. The system update procedure planning apparatus according to claim 3,
wherein the state element model simplification section simplifies the state element model by converting each unit into a state transition system comprising global states viewed from entire unit, and then summarizing states that can come and go by transitions that are not observed from outside.

5. The system update procedure planning apparatus according to claim 1,
wherein the internal transition completion section completes, for the route on the simplified state element model, internal transitions necessary to execute the route on the state element model before simplification, thereby converts the route into the executable route on the state element model before simplification.

6. The system update procedure planning apparatus according to claim 5,
wherein the state element model simplification section generates internal route retention table that holds information on some of the simplified state transitions in addition to the simplified state element model, and
the internal transition completion section checks whether all the transitions included in the route on the simplified state element model can be executed on the state element model before simplification, and completes, for the transitions that cannot be executed, route to the executable state corresponding to the transition by referring the internal route retention table, thereby converts the route into the executable route on the state element model before simplification.

7. A system update procedure planning method for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs,
the system update procedure planning method comprising:
outputting a simplified state element model by applying a simplification transformation based on the unit affiliation information to the state element model;
outputting an executable route, for the simplified state element model, from an initial state thereof to a target state; and
converting the executable route from the initial state to the target state on the simplified state element model into the executable route from an initial state to a target state on the state element model before simplification.

8. A non-transitory computer-readable recording medium in which a system update procedure planning program is recorded, the system update procedure planning program being executed on a computer for outputting an executable route on a state element model as a system update procedure, based on the state element model describing a system update by a plurality of state elements and a constraint expression specified with the plurality of state elements, unit affiliation information indicating to which of a plurality of units each state element in the state element model belongs,
the system update procedure planning program causing the computer to perform:
a state element model simplification process of outputting a simplified state element model by applying a simplification transformation based on the unit affiliation information to the state element model;
an automatic planning process of outputting an executable route, for the simplified state element model, from an initial state thereof to a target state; and
an internal transition completion process of converting the executable route from the initial state to the target state on the simplified state element model into the executable route from an initial state to a target state on the state element model before simplification.

* * * * *